(12) United States Patent
Ekiner et al.

(10) Patent No.: US 8,101,009 B2
(45) Date of Patent: Jan. 24, 2012

(54) SEPARATION MEMBRANE BY CONTROLLED ANNEALING OF POLYIMIDE POLYMERS

(75) Inventors: Okan Max Ekiner, Wilmington, DE (US); John W. Simmons, Wilmington, DE (US)

(73) Assignee: L'Air Liquide Societe Anonyme pour l'Etude Et L'Exploitation des Procedes Georges Claude, Paris (FR)

( * ) Notice: Subject to any disclaimer, the term of this patent is extended or adjusted under 35 U.S.C. 154(b) by 331 days.

(21) Appl. No.: 12/206,449

(22) Filed: Sep. 8, 2008

(65) Prior Publication Data

US 2009/0227744 A1    Sep. 10, 2009

Related U.S. Application Data

(63) Continuation-in-part of application No. 11/070,041, filed on Mar. 2, 2005, now Pat. No. 7,422,623.

(51) Int. Cl.
*B01D 53/22* (2006.01)
*B01D 71/64* (2006.01)
*B01D 67/00* (2006.01)

(52) U.S. Cl. .............. 95/45; 95/50; 95/51; 95/54; 95/55; 96/4; 96/8; 96/10; 96/13; 96/14; 210/640; 210/500.23; 210/500.28; 210/500.39; 55/DIG. 5

(58) Field of Classification Search .............. 95/45, 50, 95/51, 54, 55; 96/4, 8, 10, 12, 13, 14; 55/DIG. 5; 210/640, 500.22, 500.23, 500.27, 500.28, 210/500.38, 500.39
See application file for complete search history.

(56) References Cited

U.S. PATENT DOCUMENTS

| | | | |
|---|---|---|---|
| 3,822,202 A * | 7/1974 | Hoehn | ............................. 95/55 |
| 4,080,744 A | 3/1978 | Manos | |
| 4,120,098 A | 10/1978 | Manos | |
| 4,532,041 A | 7/1985 | Shuey et al. | |
| 4,571,444 A | 2/1986 | Black et al. | |

(Continued)

FOREIGN PATENT DOCUMENTS

EP    0 732 143    9/1996

(Continued)

OTHER PUBLICATIONS

International Search Report for PCT/IB2006/000073, mailed May 24, 2006.

*Primary Examiner* — Jason M Greene
(74) *Attorney, Agent, or Firm* — Christopher J. Cronin

(57) ABSTRACT

This abstract discusses membranes needed to separate fluids for the production of oxygen-enriched air, nitrogen-enriched-air, for the separation of carbon dioxide from hydrocarbons, and the separation of hydrogen from various petrochemical and oil refining streams. Membranes are needed that provide a resistance to interaction with process components or contaminants, provide the mechanical strength required to withstand high membrane differential pressures and high process temperatures, and exhibit sufficient maximum strain such that membranes are not brittle and can easily be formed into desirable membrane forms. Membranes of polyimide polymers, particularly polyimide polymers sold under the trade name P-84, are annealed in a controlled annealing step to improve the mechanical properties of the polymers used to make separation membranes. The resulting annealed polyimide polymer is used to produce various forms of high strength, chemically resistant membranes, including hollow-fiber membranes that are suitable for high pressure, high temperature applications.

36 Claims, 10 Drawing Sheets

U.S. PATENT DOCUMENTS

| | | | |
|---|---|---|---|
| 4,606,903 A | 8/1986 | Hafez et al. | |
| 4,705,540 A | 11/1987 | Hayes | |
| 4,717,393 A | 1/1988 | Hayes | |
| 4,836,927 A | 6/1989 | Wan | |
| 4,880,442 A | 11/1989 | Hayes | |
| 5,015,270 A * | 5/1991 | Ekiner et al. | 95/54 |
| 5,055,116 A | 10/1991 | Kohn et al. | |
| 5,085,676 A | 2/1992 | Ekiner et al. | |
| 5,133,867 A | 7/1992 | LaFreniere | |
| 5,248,319 A * | 9/1993 | Ekiner et al. | 95/54 |
| 5,591,250 A * | 1/1997 | Stern et al. | 95/51 |
| 5,605,627 A | 2/1997 | Carlsen et al. | |
| 5,635,067 A * | 6/1997 | Macheras | 210/500.23 |
| 5,683,584 A | 11/1997 | Wenthold et al. | |
| 5,762,798 A | 6/1998 | Wenthold et al. | |
| 5,917,137 A * | 6/1999 | Ekiner | 96/10 |
| 5,969,087 A * | 10/1999 | Maeda | 96/13 |
| 6,180,008 B1 * | 1/2001 | White | 210/500.39 |
| 6,187,987 B1 * | 2/2001 | Chin et al. | 210/654 |
| 6,383,265 B1 * | 5/2002 | Ekiner | 96/10 |
| 7,393,383 B2 * | 7/2008 | Ekiner et al. | 95/45 |
| 7,422,623 B2 * | 9/2008 | Ekiner et al. | 95/45 |
| 2004/0107830 A1 | 6/2004 | Simmons et al. | |
| 2004/0147796 A1 | 7/2004 | Roman et al. | |
| 2004/0177753 A1* | 9/2004 | Chung et al. | 95/43 |
| 2004/0222169 A1 | 11/2004 | Yuan | |

FOREIGN PATENT DOCUMENTS

| | | |
|---|---|---|
| WO | WO 2004/099299 | 11/2004 |

* cited by examiner

Imidization of Seven-membered Anhydride-Isocyanate Intermediate

Formation Of Polyimide and Seven-membered cyclic Anhydride-isocyanate Intermediate C13 {H1} Observe s2pul
Lims ID: 319443
Operator: A.J. Beeler
Notebook #: E102973-11-1
Filename: 319443_C13_021023_1434
Date: 10/23/02 14:34

NMP Solvent

SEPARATION MEMBRANE BY CONTROLLED ANNEALING OF POLYIMIDE POLYMERS

CROSS-REFERENCE TO RELATED APPLICATIONS

This is a Continuation-In-Part of U.S. patent application Ser. No. 11/070,041 filed Mar. 2, 2005 entitled "IMPROVED SEPARATION MEMBRANCE BY CONTROLLED ANNEALING OF P-84 POLYIMIDES".

BACKGROUND

This invention relates to improved membranes for the separation of fluids made from polymers.

Permselective membranes for fluid separation are known and used commercially in applications such as the production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. Some membranes are made of materials that have high permeabilities, but exhibit low permselectivities. For certain fluid streams, one or more component or minor contaminant, such as organic solvents, may exhibit a strong interaction with the material of the membrane, which can result in the loss of performance due to plasticizing the membrane or other problems. Some membrane materials may offer resistance to this interaction with contaminants, but suffer from poor mechanical properties, resulting in membrane failure when exposed to high membrane differential pressures and high temperatures. Other materials, such as previously available polyimide polymers, are not capable of processing into membranes of the desired configuration (such as a hollow fiber membrane). A membrane with a good balance of high productivity and selectivity for the fluids of interest, and persistently good separation performance despite long-term contact with aggressive process composition, pressure and temperature conditions, and that can be processed into a wide variety of membrane configurations is highly desired.

Membranes of polyimide polymers are desirable for their chemical resistant properties. However, some commercially available polyimide polymers are low molecular weight (MW) and prone to hydrolysis. Solution spinning of these polymers results in brittle hollow fibers. Due to the poor mechanical properties of these fibers, the polyimide polymers are difficult to commercially use to produce gas separation membranes, particularly hollow fiber membranes.

The references discussed below describe separation membranes known in the art and disclose information relevant to polyimide polymer membranes. However, these references suffer from one or more of the disadvantages discussed above.

U.S. Pat. No. 4,705,540 discloses highly permeable polyimide gas separation membranes prepared from phenylene diamines having substituents on all positions ortho to the amine functions and a rigid dianhydride or mixtures thereof, specifically pyromellitic dianhydride (PMDA) and 4, 4'-(hexafluoroisopropylidene)-bis (phthalic anhydride) (6FDA).

U.S. Pat. No. 4,717,393 shows that polyimides incorporating at least in part 3, 3', 4, 4'-benzophenone tetracarboxylic dianhydride and phenylene diamines having substituents on all positions ortho to the amine functions can be photo chemically crosslinked. Photochemical crosslinking is not considered a practical method for fabricating cost-effective gas separation membranes.

U.S. Pat. No. 4,880,442 discloses highly permeable polyimide gas separation membranes prepared from phenylene diamines having substituents on all positions ortho to the amine functions and essentially nonrigid dianhydrides.

U.S. Pat. Nos. 5,055,116 and 5,635,067 describe blends of polyimides designed to attempt to create a membrane with desirable performance properties. Polymeric blending has traditionally been thought to be problematic or result in poor mechanical properties, and limited range of fluid transport properties.

U.S. Pat. Nos. 4,532,041, 4,571,444, 4,606,903, 4,836,927, 5,133,867, 6,180,008, and 6,187,987 disclose membranes based on a polyimide copolymer derived from the co-condensation of benzophenone 3, 3', 4, 4'-tetracarboxylic acid dianhydride (BTDA) and a mixture of di(4-aminophenyl)methane and a mixture of toluene diamines useful for liquid separations.

U.S. Pat. Nos. 5,605,627, 5,683,584, and 5,762,798 disclose asymmetric, microporous membranes based on a polyimide copolymer derived from the co-condensation of benzophenone-3, 3', 4, 4'-tetracarboxylic acid dianhydride (BTDA) and a mixture of di(4-aminophenyl)methane and a mixture of toluene diamines useful for liquid filtration or dialysis membranes.

It is highly desirable to create a membrane that can be used commercially in applications such as the production of oxygen-enriched air, production of nitrogen-enriched-air for inerting and blanketing, separation of carbon dioxide from methane or nitrogen for the upgrading of natural gas streams, and the separation of hydrogen from various petrochemical and oil refining streams. The desired membranes should exhibit a resistance to interaction of the material with the process and the resulting plasticizing of the membrane. Furthermore, membranes should have superior mechanical properties to allow the use of the membranes in high differential pressure applications, and should be capable of easily processing into membranes of the desired configuration (such as a hollow fiber membrane). Thus, membranes with a good balance of high productivity and selectivity for the fluids of interest, and persistently good separation performance despite long-term contact with aggressive process compositions, pressure and temperature conditions are desired.

SUMMARY

The membranes of the invention satisfy the need to have membranes that exhibit a resistance to interaction of the material with the process and the resulting plasticizing of the membrane. Furthermore, membranes of the invention have surprisingly superior mechanical properties, resulting in superior performance when exposed to high membrane differential pressures and high process temperatures. The membranes of the invention are pliable (not brittle), and are capable of processing into membranes of a wide variety of desired configurations (particularly hollow fiber membranes). The membranes of the invention have a good balance of high productivity and selectivity for the fluids of interest, and persistently good separation performance despite long-term contact with aggressive process compositions, pressure and temperature conditions.

The present invention provides a membrane for fluid separation containing an annealed polyimide polymer, wherein the annealed polyimide polymer comprises a number of first repeating units of formula (I), which is described below.

Commercially available virgin polyimide polymer is subjected to an annealing process to form the annealed polyimide polymer of the current invention, which surprisingly increases the mechanical properties of the final membrane.

The first repeating units of the annealed polyimide polymer are of a formula (I):

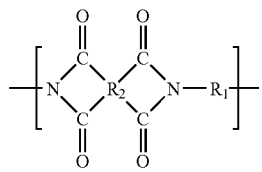

(I)

In formula (I), $R_1$ is a molecular segment of a formula (A), formula (B), formula (C), or mixtures of formula (A), formula (B), and formula (C), where formula (A), formula (B), and formula (C) are:

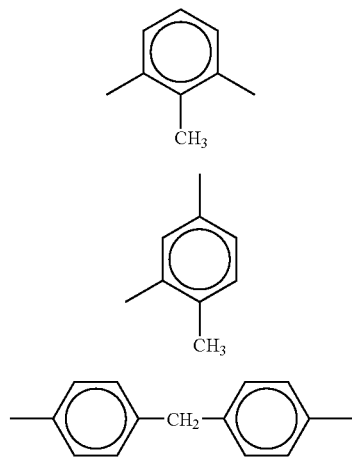

(A)

(B)

(C)

Furthermore, in formula (I), $R_2$ is a molecular segment of a formula (Q), formula (S), formula (T), or mixtures of formula (Q), formula (S), and formula (T), where formula (Q), formula (S), and formula (T) are:

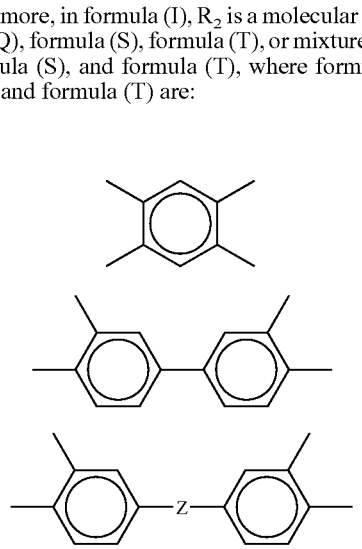

(Q)

(S)

(T)

In formula (T) above, Z is a molecular segment of a formula (L), formula (M), formula (N), or mixtures of formula (L), formula (M), and/or formula (N), where formula (L), formula (M), and formula (N) are:

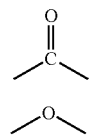 (L)

 (M)

 (N)

Referring to the annealed polyimide polymer discussed above, the first repeating units may alternately be of a formula (Ia), where formula (Ia) is:

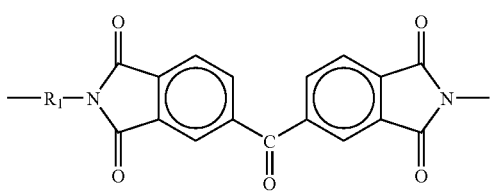

(Ia)

In formula (Ia), $R_1$ is a molecular segment having a composition of formula (A), formula (B), or formula (C), or a mixture of formula (A), formula (B), or formula (C) in the first repeating units and where formula (A), (B), and (C) are those described above.

In another alternate embodiment of formula (Ia), the $R_1$ in formula (Ia) has a composition of formula (A) in about 10-25% of the first repeating units, formula (B) in about 55-75% of the first repeating units, and formula (C) in about 20-40% of the first repeating units.

In another alternate embodiment of formula (Ia), the molecular segment $R_1$, has a composition of formula (A) in about 16% of the first repeating units, formula (B) in about 64% of the first repeating units, and formula (C) in about 20% of the first repeating units.

Again, referring to the annealed polyimide polymer, the first repeating units may alternately be of a formula (Ib), shown below.

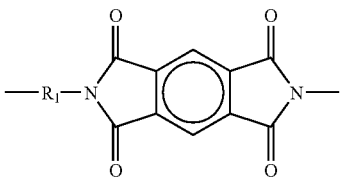

(Ib)

In formula (Ib), $R_1$ is a molecular segment having a composition of formula (A), formula (B), or mixtures of formula (A) and formula (B) in the first repeating units where formula (A), and (B) are described above.

Again, referring to the annealed polyimide polymer, the first repeating units may alternately be of formula (Ia), and/or formula (Ib), wherein formula (Ia) and formula (Ib) are described above.

In one embodiment of the invention, the non-annealed polyimide polymer contains a number of second repeating units of formula (II):

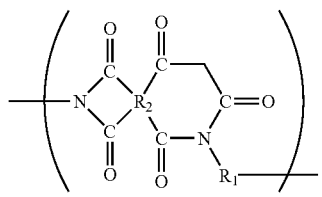

(II)

wherein $R_1$ and $R_2$ are moieties as defined for formula (I) above, and wherein the non-annealed polymer contains less than 3 mol % of the second repeating units.

In other alternate embodiments, the non-annealed polyimide polymer contains less than about 1 mole % of the second repeating units, and in one embodiment, the non-annealed polyimide polymer is substantially void of the second repeating units.

The polyimide polymer is typically, but not necessarily, a polyimide polymer sold under the tradename P84, P84HT, or mixtures thereof.

The annealed polyimide polymers of the current invention can be made into any membrane form, and are particularly suited for the production of hollow fiber membranes. Membranes of the annealed polyimide polymer exhibit a surprisingly high maximum strain of above about 50% and furthermore above about 100%.

A process for producing a fluid separating membrane and the product produced by the process includes the steps of:
(a) providing a polyimide polymer comprising a number of first repeating units of formula (I) as described above;
(b) annealing the polyimide polymer to form an annealed polyimide polymer;
(c) synthesizing a concentrated solution, wherein the concentrated solution comprises a solvent and the annealed polyimide polymer; and
(d) forming a membrane.

In alternate embodiments of the process above:
(a) the annealing step is conducted by a process of mechanical annealing, thermal annealing, or combinations thereof;
(b) the annealing step is conducted for a period of time of about 6-30 hours at a temperature of about 100-250° C.;
(c) the annealing step is conducted under a vacuum of greater than about 15 inches of mercury;
(d) the annealed polyimide polymer comprises less than about 1 to about 3 mole % of a second repeating unit wherein the second repeating unit is a moiety for formula (II) as described above; and
(e) the concentrated solution contains about 30 weight % of the annealed polyimide polymer, wherein the solvent is NMP, and wherein the concentrated solution has a zero-shear complex viscosity of greater than about 90 Pa·s at 40° C.

Furthermore, this invention includes a method of separating one or more fluids from a fluid mixture comprising the actions of:
(a) providing a fluid separation membrane of the current invention;
(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane; and
(c) withdrawing the permeate fluid mixture and the retentate fluid mixture separately.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
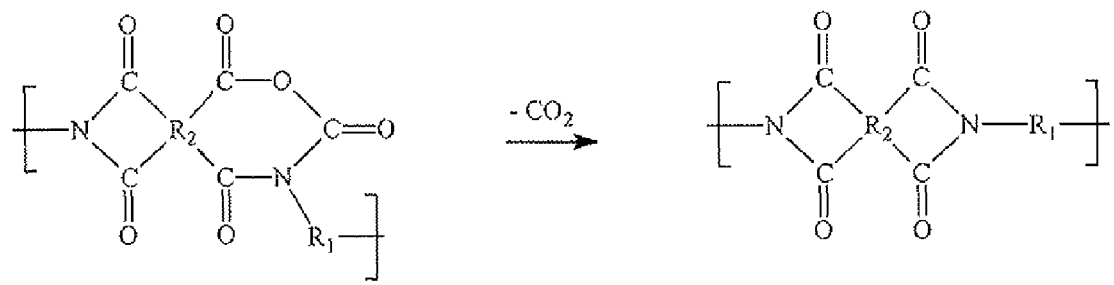
FIG. 1 shows the conversion of a seven-membered anhydride-isocyanate intermediate moiety to an imide moiety.

The present invention provides a membrane for fluid separation comprising a polyimide polymer that has been subjected to an annealing step (an annealed polyimide polymer), wherein the annealed polyimide polymer contains a number of first repeating units of formula (I) which is described below. Other components can be present in the polymer such as, processing aids, chemical and thermal stabilizers and the like, provided that they do not significantly adversely affect the separation performance of the membrane. Furthermore, the present invention includes a method of producing a polyimide polymer membrane for fluid separation using the annealing process of the current invention, a membrane for fluid separation produced by that method, and a process of using the membrane for fluid separation.

As used in this application, a "repeating unit" is a molecular segment in the polymer chain backbone that repeats itself regularly along the polymer chain. In this respect, the term repeating units is meant to cover all portions of such polymers and any number of the repeating units.

As used in this application, an "imidized polymer" or "annealed polyimide polymer", is a polyimide polymer that has been exposed to the structure-altering thermal or mechanical treatment process of the current invention.

As used in this application, a "virgin polyimide polymer", is a polyimide polymer that has not been exposed to the annealing process of the current invention.

As used in this application, "P84" or "P84HT" refers to polyimide polymers sold under the tradenames P84 and P84HT, respectively from HP Polymers GmbH.

The membrane of the current invention comprises a polyimide polymer that has been subjected to an annealing step (an annealed polyimide polymer), wherein the annealed polyimide polymer comprises a number of first repeating units of formula (I), which is described below.

The first repeating units of the annealed polyimide polymer are of a formula (I):

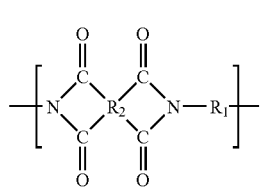

(I)

In formula (I), $R_1$ is a molecular segment of a formula (A), formula (B), formula (C), or mixtures of formula (A), formula (B), and formula (C), where formula (A), formula (B), and formula (C) are:

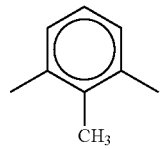

(A)

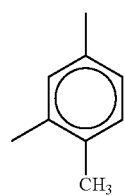

(B)

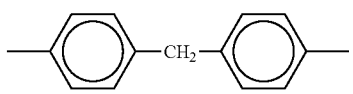

(C)

Furthermore, in formula (I), $R_2$ is a molecular segment of a formula (Q), formula (S), formula (T), or mixtures of formula (Q), formula (S), and formula (T), where formula (Q), formula (S), and formula (T) are:

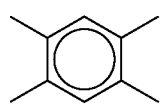

(Q)

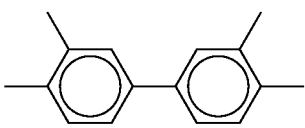

(S)

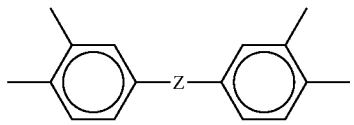

(T)

In formula (T) above, Z is a molecular segment of a formula (L), formula (M), formula (N), or mixtures of formula (L), formula (M), and/or formula (N), where formula (L), formula (M), and formula (N) are:

(L)

(M)

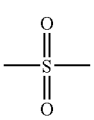

(N)

Referring to the annealed polyimide polymer, the first repeating units may alternately be of a formula (Ia), where formula (Ia) is:

(Ia)

In formula (Ia), $R_1$ is a molecular segment having a composition of formula (A), formula (B), or formula (C), or a mixture of formula (A), formula (B), or formula (C) in the first repeating units and where formula (A), (B), and (C) are those described above.

In another alternate embodiment of formula (Ia), the $R_1$ in formula (Ia) has a composition of formula (A) in about 10-25% of the first repeating units, formula (B) in about 55-75% of the first repeating units, and formula (C) in about 20-40% of the first repeating units.

In another alternate embodiment of formula (Ia), the molecular segment $R_1$ has a composition of formula (A) in about 16% of the first repeating units, formula (B) in about 64% of the first repeating units, and formula (C) in about 20% of the first repeating units.

Again, referring to the annealed polyimide polymer, the first repeating units may alternately be of a formula (Ib), shown below.

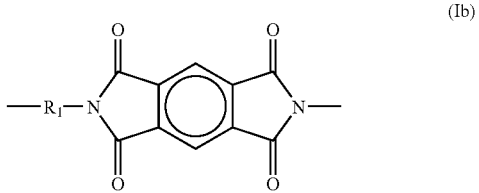

(Ib)

In formula (Ib), $R_1$ is a molecular segment having a composition of formula (A), formula (B), or mixtures of formula (A) and formula (B) in the first repeating units where formula (A), and (B) are described above.

Again, referring to the annealed polyimide polymer, the first repeating units may alternately be of formula (Ia), and/or formula (Ib), wherein formula (Ia) and formula (Ib) are described above.

In preferred membranes of the current invention, the annealed polyimide polymer makes up about 20-80% of the membrane by weight (wt %). In one preferred embodiment, membranes are produced from an annealed polyimide polymer made from a polyimide polymer belonging to the family of polyimide polymers sold under the trade names P84, P84HT, or mixtures thereof. The polyimide polymer is annealed in a controlled manner, as described herein below, to form an annealed polyimide polymer, which is then made into the membrane of the current invention. The controlled annealing process allows the polymer to be used to produce a desirable membrane with surprising performance and strength characteristics. Furthermore, the annealing process allows the polyimide polymers to by used to produce membranes in forms that are highly desirable. One preferred membrane form is a hollow fiber. Membranes of the current invention have a maximum strain of above about 50%, preferably above about 100%.

The annealed polyimide polymers are suitable molecular weight to be film forming and pliable so as to be capable of being formed into continuous films or membranes. The annealed polyimide polymers of this invention preferably, but not necessarily, have an inherent viscosity within the range of about 0.52 to about 0.62 deciliters/gram (dl/gm) and more preferably about 0.54 to about 0.6 dl/gm.

In one embodiment of the current invention, the non-annealed polyimide polymer contains less than 3 mole % of a second repeating unit of formula (II):

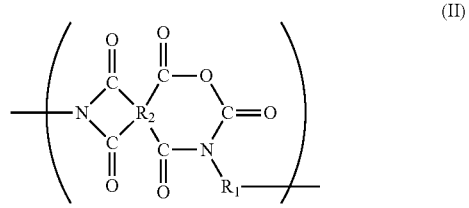

(II)

In another embodiment, the non-annealed polyimide polymer comprises less than about 1 mole % second repeating units. In still another embodiment, the non-annealed polyimide polymer is substantially void of second repeating units.

The membranes of the current invention are produced by a process comprising the actions of:
a) providing a polyimide polymer comprising a number of first repeating units of formula (I) as described above;
b) annealing the polyimide polymer to form an annealed polyimide polymer;
c) synthesizing a concentrated solution, wherein the concentrated solution comprises a solvent and the annealed polyimide polymer; and
d) forming a membrane.

In one embodiment of the current invention, before annealing the polyimide polymer (in other words, the non-annealed polyimide polymer or virgin polyimide polymer) contains a number of second repeating units of formula (II) as described above. The virgin polyimide polymer of this embodiment typically contains greater than 3 mole % of the second repeating units, and in some embodiments contains from 3 to 10 mole % of the second repeating units. The annealing step of the current invention decreases the number of second repeating units contained in the annealed polyimide polymer to less than about 3 mole %. In other embodiments, the annealing step decreases the number of second repeating units contained in the annealed polyimide polymer to less than about 1 mole %, or removes substantially all of the second repeating units.

The annealing step can be performed by any annealing process known to one of ordinary skill in the art. Preferable processes for annealing include, but are not limited to mechanical, thermal annealing, or combinations thereof.

The concentrated solution referenced in the synthesis step of current invention preferably, but not necessarily, contains about 30 weight % (wt %) of the annealed polyimide polymer in NMP solvent. The zero-shear complex viscosity for the concentrated solutions containing NMP and 30 wt % of virgin (non-annealed) polyimide polymers, and NMP and 30 wt % of annealed polyimide polymer are shown in FIGS. 7-11. The concentrated solution containing the annealed polyimide polymer in one embodiment has a zero-shear complex viscosity of greater than about 90 Pa·s at 40° C., in another of greater than about 150 Pa·s at 40° C., and in yet another of about 150 Pa·s to about 500 Pa·s at 40° C.

The polyimide polymer of the current invention is preferably, but not necessarily, a polyimide polymer belonging to the family of polyimide polymers sold under the tradenames P84, P84HT, or mixtures of P84 and P84HT. One preferred polyimide polymer has an inherent viscosity of greater than about 0.52 dl/gm before the annealing step. In another embodiment, the annealed polyimide polymer has an inherent viscosity of greater than about 0.58 dl/gm after the annealing step. One preferred process of annealing increases the inherent viscosity of the virgin polyimide polymer by at least about 5%.

The current invention includes a method of separating one or more fluids from a fluid mixture comprising the actions of:
(a) providing a fluid separation membrane of the current invention;
(b) contacting a fluid mixture with a first side of the fluid separation membrane thereby causing a preferentially permeable fluid of the fluid mixture to permeate the fluid separation membrane faster than a less preferentially permeable fluid to form a permeate fluid mixture enriched in the preferentially permeable fluid on a second side of the fluid separation membrane, and a retentate fluid mixture depleted in the preferentially permeable fluid on the first side of the fluid separation membrane; and
(c) withdrawing the permeate fluid mixture and the retentate fluid mixture separately.

The novel method can operate under a wide range of conditions and is thus adapted to accept feed streams supplied from a diverse range of sources. If the feed stream is a fluid that exists already at a sufficiently high pressure and a pressure gradient is maintained across the membrane, the driving force for separation can be adequate without raising feed stream pressure farther. In one preferred embodiment, the driving force for separation is a pressure gradient across the membrane of about 0.60 to about 13.8 MegaPascals (MPa) (100-2000 psi). In another preferred method, the pressure gradient is in a range of about 6.9 to about 13.8 MPa (1000-2000 psi).

One preferred method feeds a fluid mixture to the fluid separation membrane that comprises carbon dioxide and methane. Another preferred method feeds a fluid mixture to the fluid separation membrane that comprises carbon dioxide and methane, and the pressure gradient across the membrane is in a range of about 6.9 to about 13.8 MPa (1000-2000 psi).

The annealing step of the current invention is a controlled anneal. The current method controls the temperature and time of the annealing step to achieve the desired results on the polymer structure. One method of annealing places commercially available virgin polyimide polymer in an oven or rotary dryer for a specified period of time where the temperature and atmospheric conditions are controlled. The temperature in the oven or rotary dryer is preferably about 100-250° C., more preferably about 140-180° C. The oven or rotary dryer is preferably, but not necessarily, placed under a vacuum of greater than 15 inches of mercury, more preferably greater than 20 inches of mercury, and even more preferably about 20 to 25 inches of mercury. The polyimide polymer is held at the above conditions for about 6-30 hours, and more preferably about 10-16 hours. Furthermore, this method optionally may include a nitrogen sweep of the oven or rotary drier to remove gases evolving from the polyimide polymer. Preferred polyimide polymers include, but are not limited to, polyimide polymers sold under the trade name P84 or P84HT.

Controlled annealing of these polyimide polymers is beneficial in increasing the molecular weight (MW) and degree of imidization. In one embodiment, controlling the annealing step at about 160° C. for 12 hours in a convection oven and commercially utilized rotary dryers under high levels of vacuum (20 to 25 inches of mercury) with nitrogen sweep gas results in an increase in MW and degree of imidization of the polymer while retaining the ability of the polymer to dissolve in several aprotic solvents that can be utilized in fiber spinning. Excessive annealing at higher temperatures and longer times impairs dissolution due to enhanced long chain branching and crosslinking reactions; therefore, excessive annealing is not desirable.

Concentrated spin dope solutions synthesized with the annealed polyimide polymer exhibit an increase in zero-shear viscosity over solutions synthesized with the virgin polyimide polymer. The increase in zero-shear viscosity enhances spinnability of the annealed polymer, thus allowing hollow fiber membranes to be easily produced from annealed polyimide polymers. Furthermore, fibers spun from spin dope formulations prepared from polyimide polymer subjected to a controlled anneal exhibit surprisingly enhanced mechanical properties, particularly maximum strain, necessary for gas separation module forming operations as well as capability for stable operation at high temperature and pressure in gas separation applications. These hollow fiber membranes offer significant economic advantages due to their good separation performance, surprising mechanical properties, and unusual hydrocarbon resistance in several industrial applications involving refinery $H_2$ separations and natural gas sweetening.

An additional aspect of the invention includes forming a membrane with a blend of the annealed polyimide polymer and an additional polymer. One type of polymer suitable for blending with the annealed polyimide polymer includes polyethersulfones having a plurality of repeating units represented by formula (III):

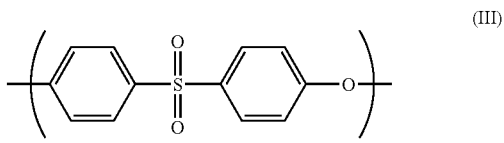

Another type of polymer suitable for blending with the annealed polyimide polymer includes polyamide-imides having a plurality of repeating units represented by formula (IV) and a plurality of repeating units represented by formula (V):

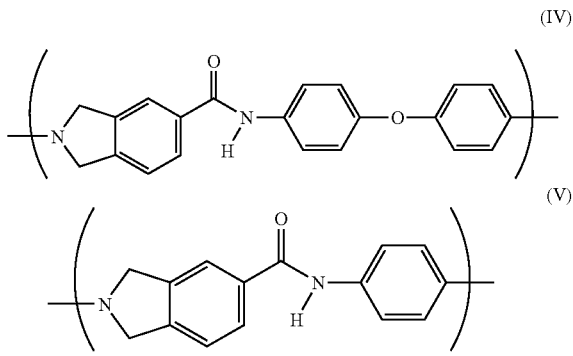

The polyamide-imide is commercially available under the trade name Torlon® from Solvay Advanced Polymers (Alpharetta, Ga., U.S.A.). The annealed polyimide and the additional polymer may be blended in whichever proportions their miscibilities allow them to be blended. Typically, they are blended in a 1:1 weight ratio.

Yet another aspect of the invention includes forming a membrane with a blend of the virgin polyimide polymer and an additional polymer. In this case, the amount of the virgin polyimide polymer is kept low, preferably less than 33% by weight, in order to avoid the poor mechanical properties believed to be created by forming a membrane with 100% of the virgin polymide polymer. One type of polymer suitable for blending with the virgin polyimide polymer includes the polyethersulfone having a plurality of repeating units represented by formula (III). Another type of polymer suitable for blending with the virgin polyimide polymer includes polyamide-imides having a plurality of repeating units represented by formula (IV) and a plurality of repeating units represented by formula (V).

Membranes of polyimide polymers are desirable for their chemical resistant properties. However, some commercially available polyimide polymers are low molecular weight (MW) and/or contain unstable moieties that are prone to hydrolysis. In particular, the polyimide polymers sold under the tradename P84, which are synthesized by condensation polymerization of diisocyanates with dianhydrides, are believed to be prone to hydrolysis. Although not intended to be bound by a theoretical understanding of the hydrolysis, it is thought that these polymers contain greater than about 3 mole % of a thermally liable and hydrolytically unstable intermediate that is a seven-membered cyclic moiety. Solution spinning of these polymers results in extremely brittle hollow fibers due to MW breakdown by hydrolysis. Due to the poor mechanical properties of these fibers, the polyimide polymers are not commercially favourable for producing gas separation membranes, particularly hollow fiber membranes.

Figure 6:
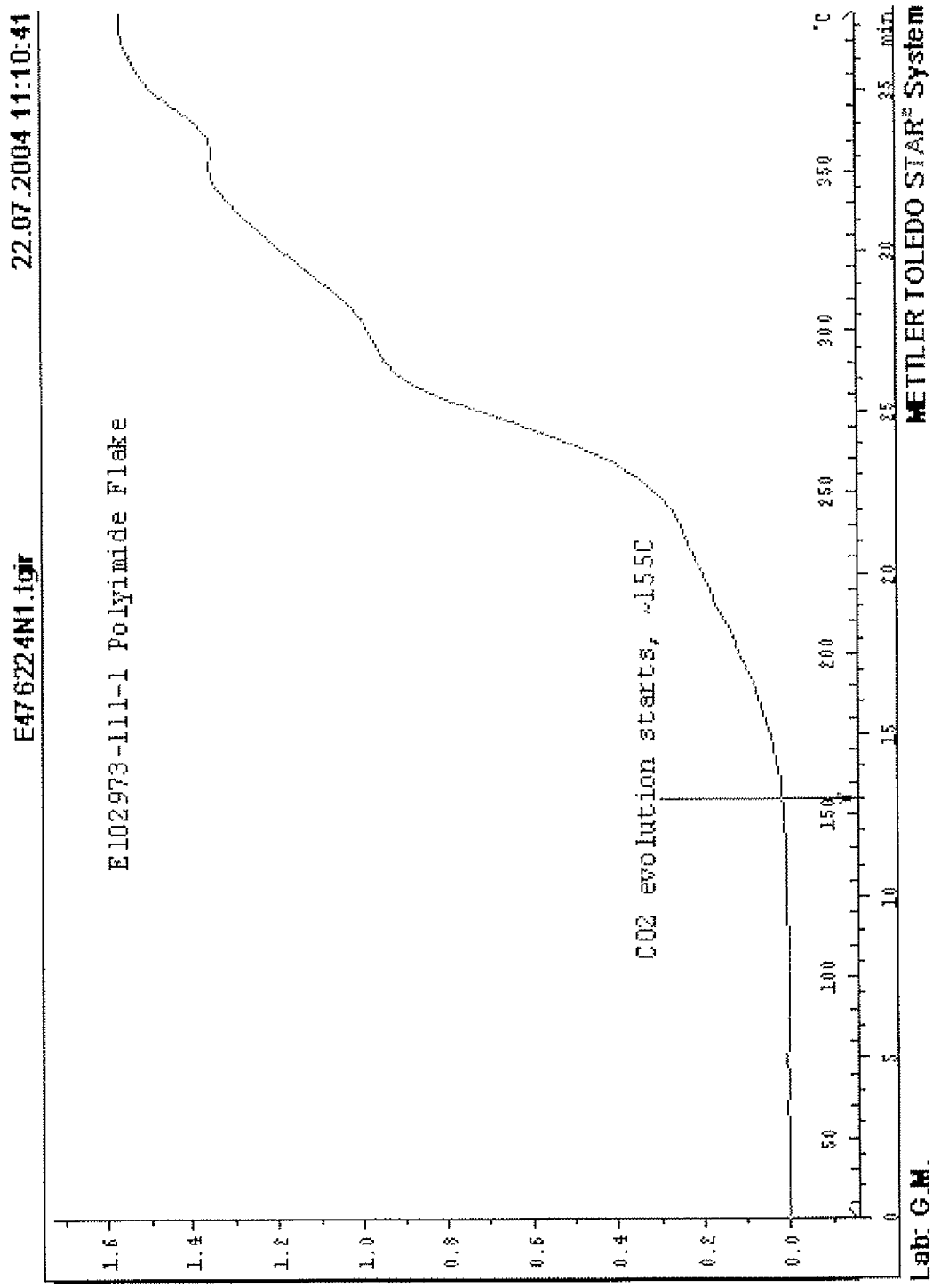
FIG. 6 shows the evolution of $CO_2$ during annealing of a sample of P84 polyimide.
Figure 7:
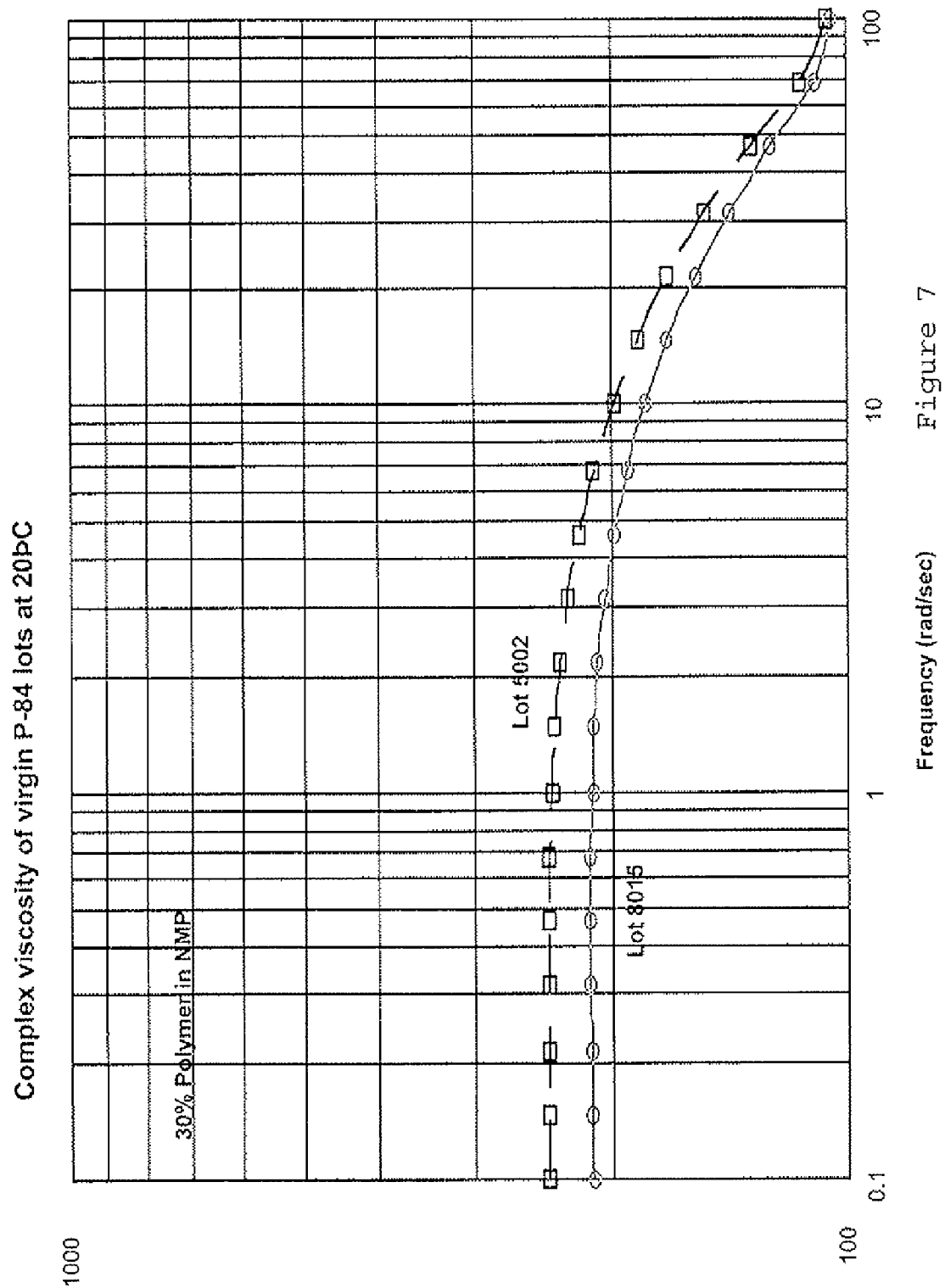
FIG. 7 shows the dynamic rheology of polyimide polymer samples before annealing.
Figure 8:
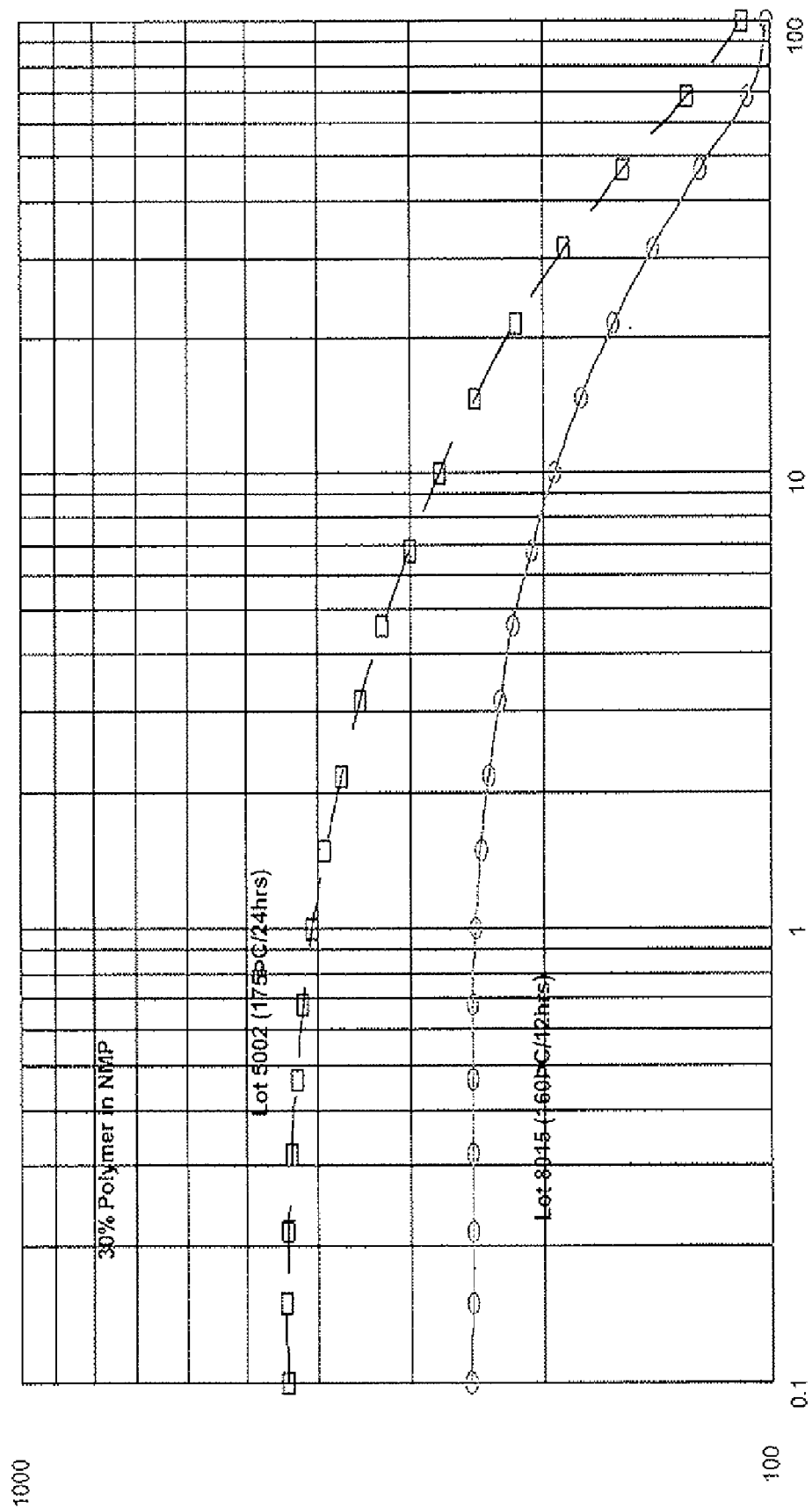
FIG. 8 shows the dynamic rheology of polyimide polymer samples after annealing.
Figure 9:
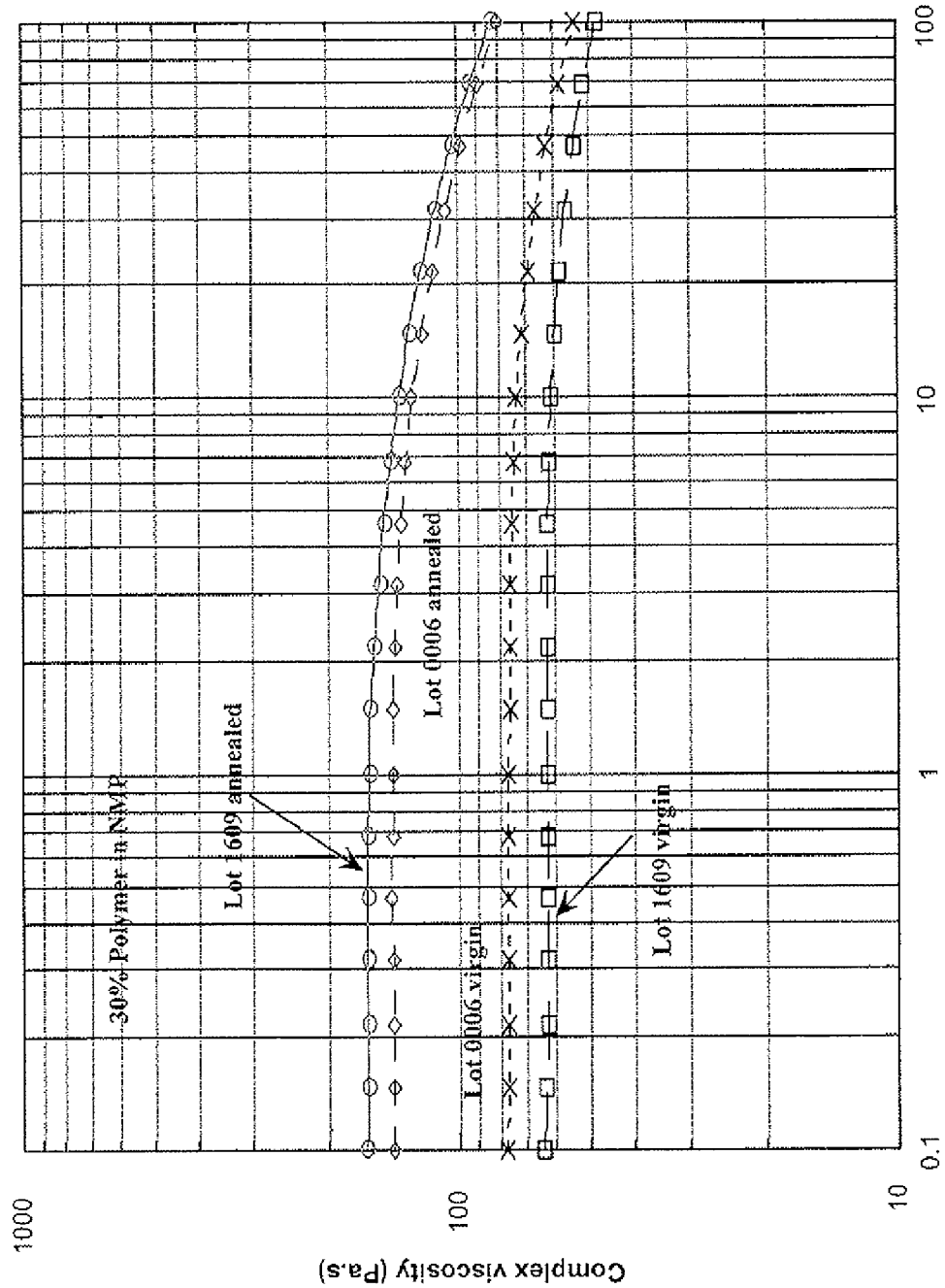
FIG. 9 shows the dynamic rheology of polyimide polymer samples before and after annealing.
Figure 10:
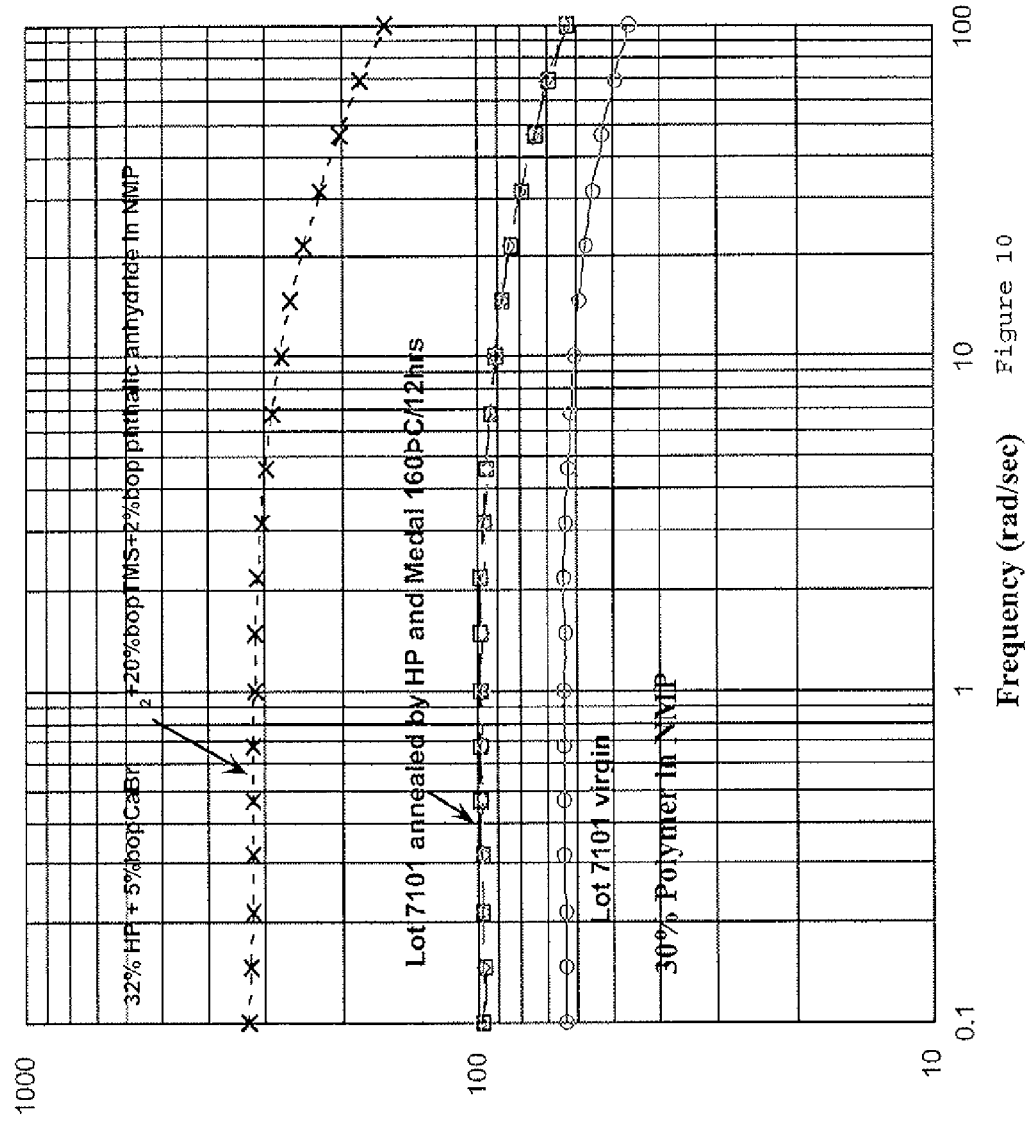
FIG. 10 shows the dynamic rheology of polyimide polymer samples before and after annealing using mechanical and thermal annealing processes.
Figure 11:
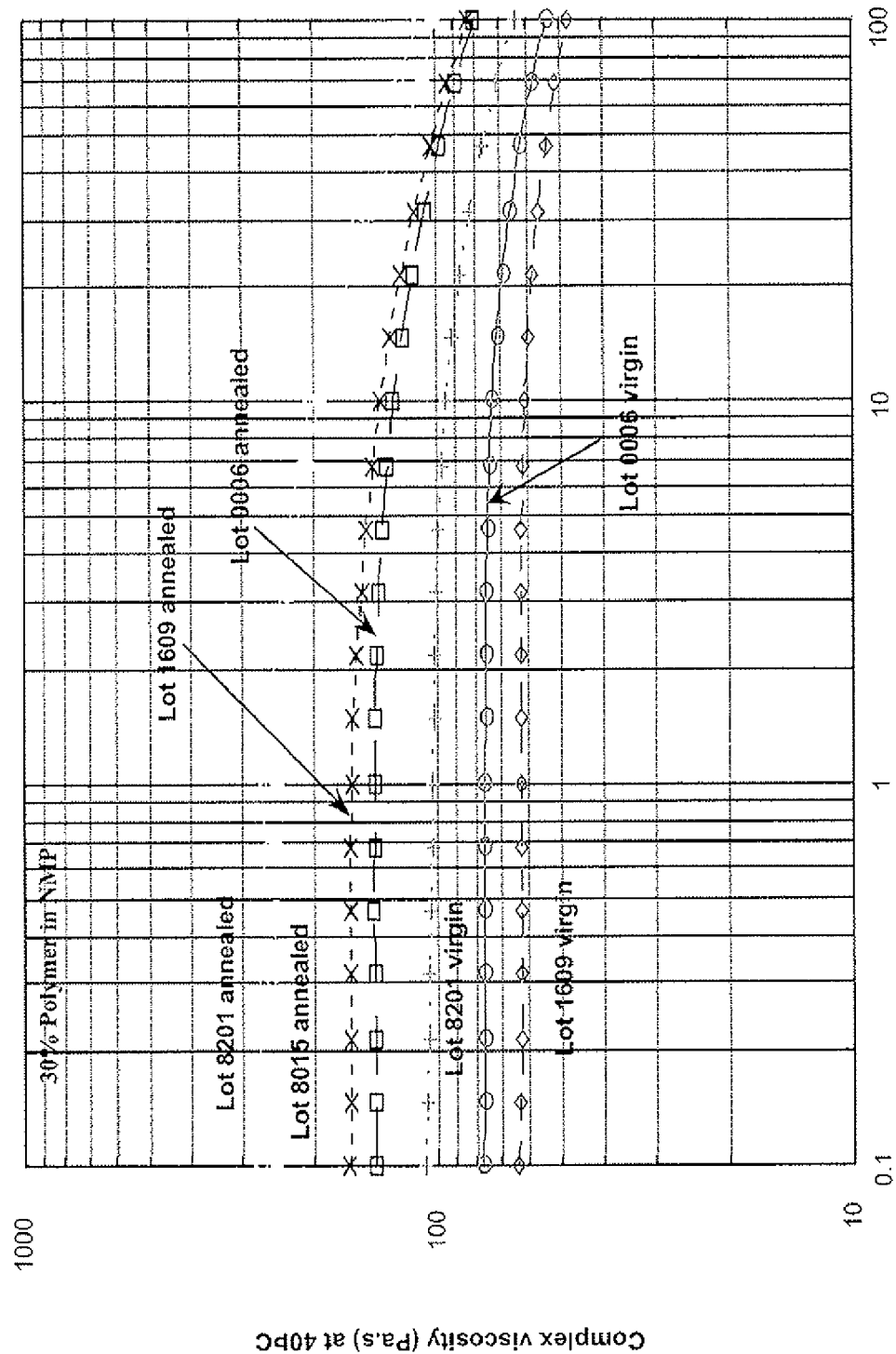
FIG. 11 shows the dynamic rheology of polyimide polymer samples before and after annealing.

Although not intended to be bound by a theoretical understanding of the mechanism of annealing, it is thought that the virgin polyimide polymer of formula (I) also contains a second repeating unit, which is a seven-membered cyclic moiety that causes the virgin polyimide polymer to be prone to hydrolysis and makes it difficult to commercially produce asymmetric membranes from the polymer. It is particularly difficult to produce hollow fiber membranes. In particular, the polyimide polymers sold under the trade name P84, which are synthesized by condensation polymerization of diisocyanates with dianhydrides, are believed to contain the unstable intermediate moiety that is subject to hydrolysis. Nuclear Magnetic Resonance (NMR) analysis supports the theory of the presence of the unstable intermediate. Thermogravimetric analysis coupled with IR (TGA/IR) and NMR data indicates the presence of an unstable moiety thought to be of formula (II) described above, found in the virgin polyimide polymer, which is substantially converted in the annealing process to a stable moiety accompanied by the evolution of $CO_2$ gas. Referring to FIG. 6, TGA/IR data confirms that $CO_2$ evolution starts around 145 to 155° C. and the rate of evolution starts to significantly increase around 180° C. Thus, in a controlled anneal, one would preferably control the temperature to be above about 145° C. and below about 180° C.

Figure 2:
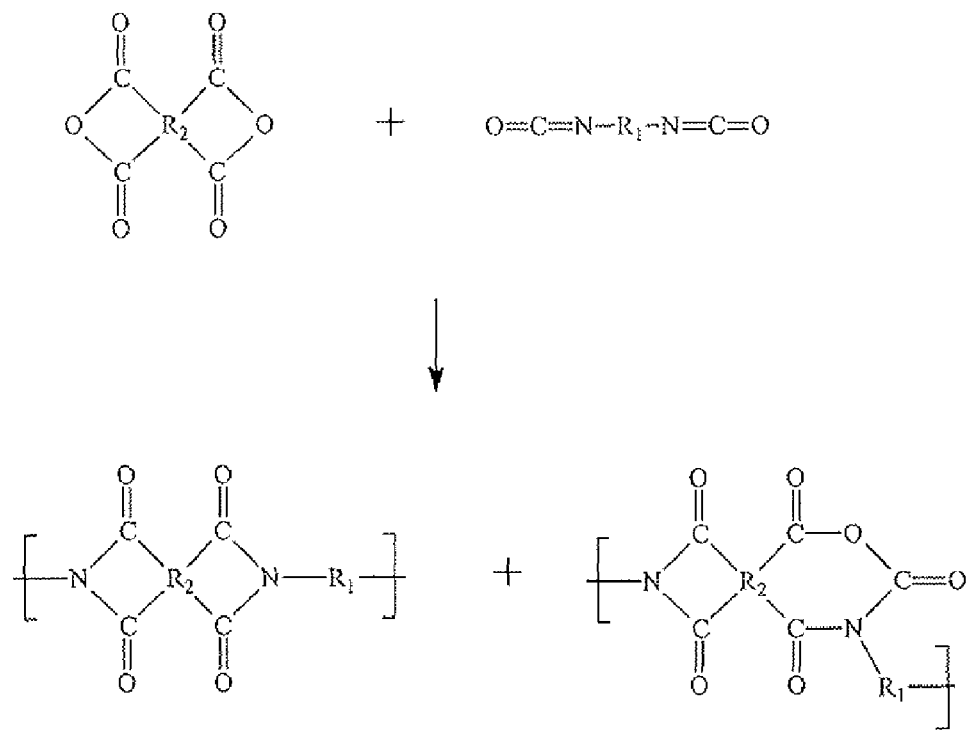
FIG. 2 shows the chemical reaction that forms a seven-membered anhydride-isocyanate intermediate moiety.
Figure 3:
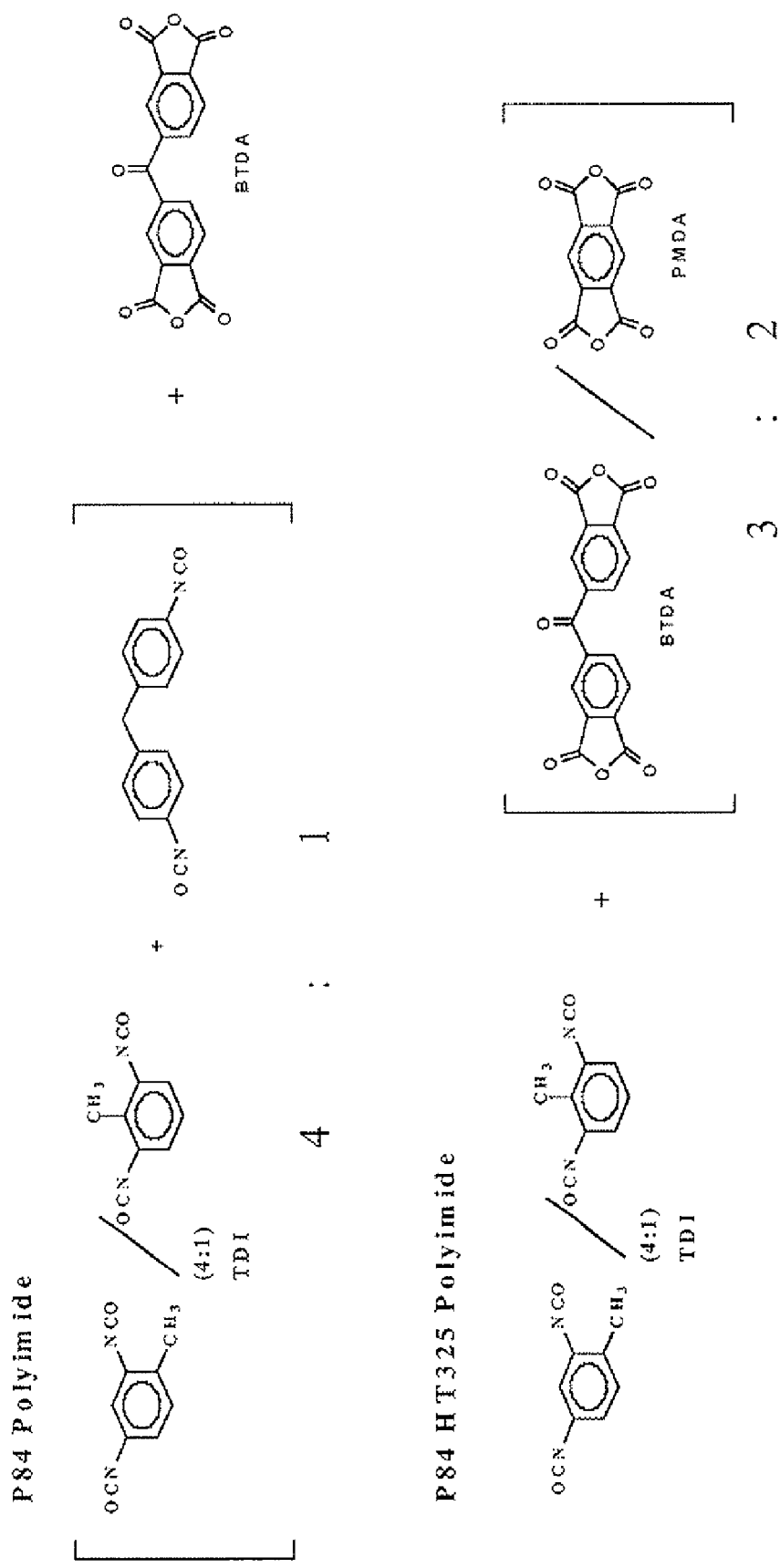
FIG. 3 shows the chemical structure of the components of two polyimide polymers.
Figure 4:
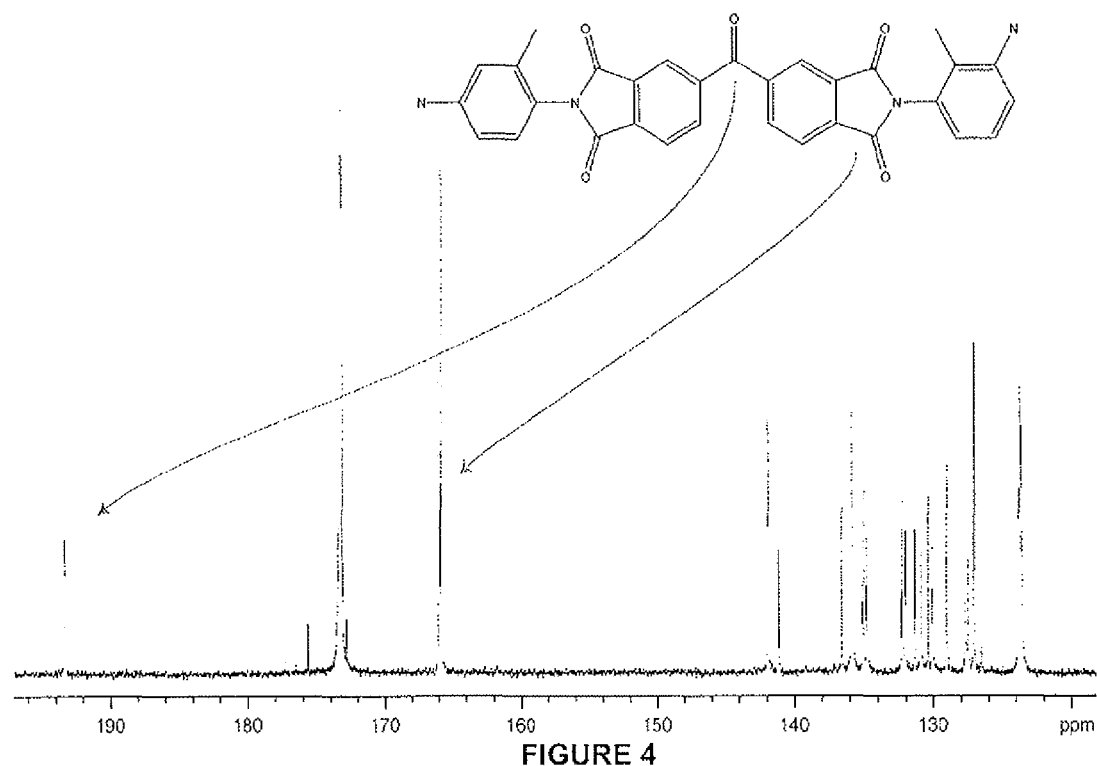
FIG. 4 shows NMR results from analysis of virgin polyimide polymers.

FIG. 2 depicts a general synthetic scheme for the production of polyimide polymers. Referring to FIG. 2, and not intending to be bound by a theoretical understanding of the mechanism of annealing, it is thought that the second repeating units, comprising the thermally liable cyclic intermediates of formula (II), are generated as a result of the reaction of the diisoyanate with a dianhydride. Referring to FIG. 1, upon controlled annealing, the second repeating units are converted to stable imide moieties, accompanied by $CO_2$ evolution. More specifically, FIG. 3 depicts the dianhydride and diisocyanate ingredients for the polymerization of embodiments sold under the tradename P84. The C13 NMR for the aromatic portion of the spectrum of P84 in NMP solution is shown in FIG. 4. Polymer samples were dissolved in NMP at 5 wt %, and solutions were run at 30° C. on a Varian Inova 500 MHz NMR spectrometer. Spectra for all the samples were collected under the same conditions.

Figure 5:
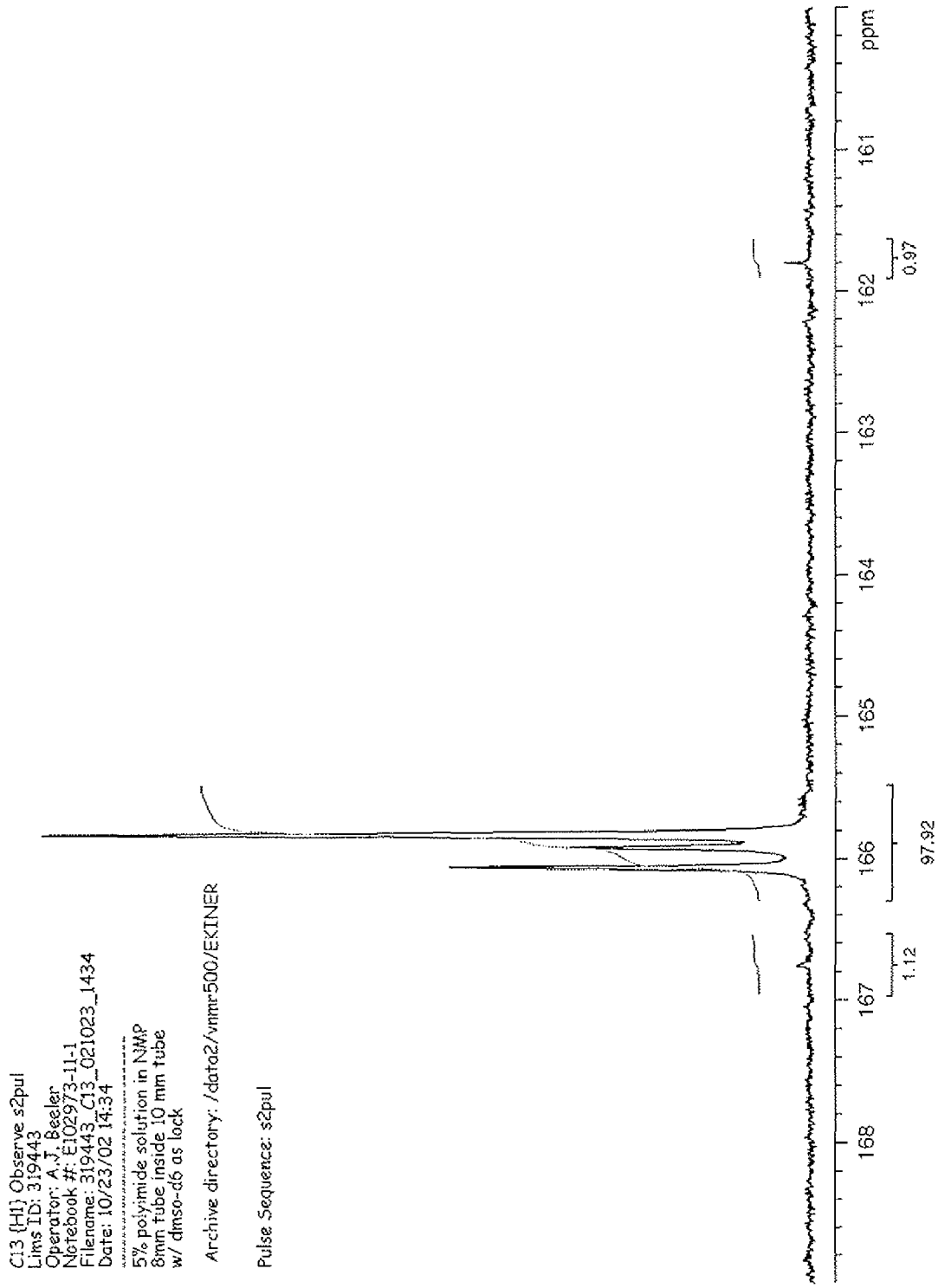
FIG. 5 shows NMR results from analysis of virgin polyimide polymers.

Signals from the BTDA carbonyl and imide carbonyls are also marked in FIG. 4. Spectra from other samples analyzed were similar. FIG. 5 contains an expansion of the imide carbonyl region. In addition to the imide carbonyls, two other weak signals are observed. A down-field peak is located at 166.75 ppm and an up-field peak is located at 161.80 ppm. These peaks can be attributed to the carbonyls of the cyclic intermediate depicted in Formula (II), to the acid or amide carbonyls of the hydrolysis product thereof (polyamic acid), or to end-group carboxyl carbonyls. Integration data for the up-field and down-field peaks is given in Table 1. The total area was kept constant and the relative percentages in moles of the up-field and down-field peaks as well as the imide carbonyls are shown. We observe in Table 1 that both sets of samples contain the up-field and down-field carbonyl peaks at approximately 1 mole % level, which are reduced upon annealing. We also see that the degree of imidization is increased due to annealing, indicating conversion of the second repeating units (the thermally liable seven-membered cyclic intermediate) or of residual polyamic acid to a stable imide moiety.

TABLE 1

| Sample number | Downfield % | Imide % | Upfield % |
|---|---|---|---|
| E102973-11-1 | 1.12 | 97.92 | 0.97 |
| E102973-11-2 | 1.07 | 98.15 | 0.77 |
| E102973-11-3 | 1.28 | 97.49 | 1.23 |
| E102973-11-4 | 0.42 | 99.60 | — |

11-1 is a small batch of non-annealed polyimide polymers
11-2 is batch 11-1 annealed at 150° C. for 24 hours in a convection oven
11-3 is a large batch of non-annealed polyimide polymers
11-4 is 11-3 annealed at 150° C. for 24 hours in a convection oven The evolution of $CO_2$ supports the theory that residual second repeating units of Formula (II) are converted to a stable polyimide moiety during annealing. TGA (Thermogravimetric analysis)/IR data clearly indicates $CO_2$ evolution during annealing. The chemigram for $CO_2$ evolution shows the integrated absorbance (infrared signal) of a specified spectral region as a function of time is included in FIG. 6, which indicates that $CO_2$ evolution starts somewhere in a range of about 145 to 155° C. FIG. 6 is marked as definitely evidencing $CO_2$ evolution by about 155° C., but one can see that the evolution may start as low as about 145° C. Table 2 summarizes the quantitative TGA/IR results. The total weight loss from the typical polyimide polymer flake over the 25 to 400° C. range is about 3.40 wt %. About 0.7 wt % is due to $CO_2$ evolution. Thus, the TGA/IR data supports the NMR conclusion above that the intensity of the weak carbonyl peaks is reduced by annealing, presumably due to conversion of the second repeating units to a stable moiety accompanied by $CO_2$ evolution.

TABLE 2

| | Evolved Gas | | | |
|---|---|---|---|---|
| | $H_2O$ | $CO_2$ | CO | DMF |
| | | Quantity, weight % | | |
| Temperature, ° C. | | 0.70 | 0.012 | 0.02 |
| 25-50 | x | x | | |
| 150-200 | | x | | x |
| 200-250 | | x | | x |
| 250-300 | | x | | x |
| 300-350 | | x | | |
| 350-400 | | x | x | |

Furthermore, the polymer molecular weight is increased by the annealing step, which is consistent with the conclusions reached based on the NMR data. Table 3 summarizes the inherent viscosities, intrinsic viscosities, and weight average molecular weights (MW) as measured by size exclusion chromatography (SEC) for three different lots of polyimide polymer that were annealed at different temperatures and times of annealing. These annealing experiments were conducted in a convection oven and in a rotary dryer wherein the polymer samples were exposed to a vacuum level of 18 to 25 inches of Hg with a $N_2$ sweep gas.

TABLE 3

| Lot | Annealing Conditions | Inherent Viscosity, dl/gm | Intrinsic Viscosity, dl/gm | SEC MW |
|---|---|---|---|---|
| 811 Virgin | — | 0.52 | — | — |
| 811 Annealed | 175° C./12 hrs in convection oven | 0.6 | — | — |

TABLE 3-continued

| Lot | Annealing Conditions | Inherent Viscosity, dl/gm | Intrinsic Viscosity, dl/gm | SEC MW |
|---|---|---|---|---|
| 8015 Virgin | — | 0.56 | 0.39 | 26.5K |
| 8015 Annealed | 160° C./12 hrs in rotary drier | 0.59 | 0.437 | 30.3K |
| 5002 Virgin | — | 0.55 | 0.38 | 24.1K |
| 5002 Annealed | 175° C./20 hrs in rotary drier | 0.58 | 0.433 | 30.6K |

SEC MW - weight average molecular weight measured by SEC in solvent dimethylacetamide One preferred polyimide polymer described herein is a polyimide polymer sold under the trade name P84, or P84-HT. Alternately, polyimide polymers may be made by methods well known in the art. The polyimide polymers can, for example, be conveniently made by polycondensation of an appropriate diisocyanate with approximately an equimolar amount of an appropriate dianhydride. Alternatively, the polyimide polymers can be, for example, made by polycondensation of equimolar amounts of a dianhydride and a diamine to form a polyamic acid followed by chemical or thermal dehydration to form the polyimide. The diisocyanates, diamines, and dianhydrides useful for making the polyimides of interest are usually available commercially.

Preferred polyimide polymers are soluble in a wide range of common organic solvents including most amide solvents that are typically used for the formation of polymeric membranes, such as N-methylpyrrolidone ("NMP"), N,N-dimethyl acetamide ("DMAC"), or highly polar solvents such as m-cresol.

The concentrated solution from which the gas separation layer of the membrane is formed may include moisture scavengers such as acetic acid anhydride or phthalic acid anhydride.

The membranes of the current invention can be fabricated into a wide variety of membrane forms by appropriate conventional methods known to one of ordinary skill in the art. The annealed polyimide polymers (or blends of annealed polyimides with the additional polymer) may be used to form a single-layer membrane of an unsupported film or fiber. The separation membrane may also comprise a very thin selective layer that forms part of a thicker structure. This may be, for example, an integral asymmetric membrane, comprising a dense skin region that forms the selective layer and a microporous support region. Such membranes are described, for example, in U.S. Pat. No. 5,015,270. As a further alternative, the membrane may be a composite membrane, that is, a membrane having multiple layers. Composite membranes typically comprise a porous but non-selective support membrane, which provides mechanical strength, coated with a thin selective layer of another material that is primarily responsible for the separation properties. Typically, such a composite membrane is made by solution-casting (or spinning in the case of hollow fibers) the support membrane, then, solution-coating the selective layer in a separate step. Alternatively, hollow-fiber composite membranes can be made by co-extrusion spinning of both the support material and the separating layer simultaneously as described in U.S. Pat. No. 5,085,676. In the case of a composite hollow fiber membrane, the separating layer of the annealed polyimide is present as a sheath over a core. For hollow fiber membranes, the supporting membrane (also referred to as the core) may be made of the same annealed polyimide (or same annealed polyimide blended with the additional polymer as described above) or it may be made of any polymer exhibiting relatively high permeance of the permeate species of interest. In other words, if one is attempting to permeate helium from a mixture of helium and nitrogen, the core may be made of a polymer exhibiting high permeance with respect to helium.

For non-limiting illustrative purposes, one method to prepare membranes in accordance with this invention is generally described as follows. An annealed polyimide polymer (or both the annealed polyimide with the additional polymer as described above for blends) in dry particulate form is dissolved in a suitable solvent, such as N-methylpyrrolidone, at a suitable polymer content, such as approximately 20-35% by weight (wt %). The polymer solution is cast as a sheet at the desired thickness onto a flat support layer (for flat sheet membranes), or extruded through a conventional hollow fiber spinneret (for hollow fiber membranes). If a uniformly dense membrane is desired, the solvent is slowly removed by heating or other means of evaporation. If an asymmetric membrane is desired, the film or fiber structure is quenched in a liquid that is a non-solvent for the polymer and that is miscible with the solvent for the polyimide. Alternatively, if a composite membrane is desired, the polymer is cast or extruded over a porous support of another material in either flat film or hollow fiber form. The separating layer of the composite membrane can be a dense, ultra-thin, or asymmetric film.

The resulting membranes may be mounted in any convenient type of housing or vessel adapted to provide a supply of the feed fluid, and removal of the permeate and residue fluids. The vessel also provides a high-pressure side or first side (for the feed fluid and residue fluid) and a low-pressure or second side of the membrane (for the permeate fluid). For example, flat-sheet membranes can be stacked in plate-and-frame modules or wound in spiral-wound modules. Hollow-fiber membranes are typically potted with a thermoset resin in cylindrical housings. The final membrane separation unit comprises one or more membrane modules, which may be housed individually in pressure vessels or multiple elements may be mounted together in a sealed housing of appropriate diameter and length.

The membranes of the current invention exhibit an excellent combination of high permselectivity and permeability for the separation of gases. Furthermore, the membranes exhibit surprisingly superior mechanical properties, which, enables the membranes to be easily fabricated into desired membrane forms that can withstand high membrane differential pressures and high temperatures.

The membranes of this invention are suitable for operating under the high pressures required for industrial separations. For example, membranes must be capable of withstanding a transmembrane pressure of 10-13.8 MPa (1500-2000 psi) in many petrochemical operations, and up to 10 MPa in natural gas sweetening operations. Typical hollow-fiber membranes are susceptible to collapse under these conditions unless the walls of the hollow fiber are capable of withstanding the forces of high pressure. Annealing the polyimides of this invention surprisingly increases the mechanical properties of the membranes, making it possible to produce hollow fiber membranes of the annealed polyimide polymers that are suitable for higher trans-membrane pressure applications.

Membranes of the current invention enable an attractive combination of carbon dioxide permeability and permselectivity for carbon dioxide over methane, nitrogen, and the like. The membranes exhibit surprising mechanical strength and exhibit little or no plasticization by carbon dioxide or aliphatic hydrocarbons, and are thus especially useful for the removal of carbon dioxide from industrially significant fluid streams, such as in natural gas sweetening. Even at high operating pressure, membranes of the current invention possess an excellent balance of fluid permeation rates and selectivity of one fluid over other fluids in the multi-component fluid mixture.

EXAMPLES

This invention is now illustrated by examples of certain representative, non-limiting embodiments thereof.

Hollow fiber membranes were produced from virgin (non-annealed) polyimide polymers and annealed polyimide polymers of the current invention. The fibers were tested for separation performance and mechanical properties, and compared. The results, summarized in Table 4, clearly indicate the superior permeation performance and surprising mechanical characteristics of the membranes produced from the annealed polyimide polymer.

Comparative Example

A Comparative example of non-annealed polyimide polymer membrane was produced for testing. A concentrated solution (spin dope) containing 33% by weight polyimide polymer sold under the tradename P84 (lot 811 with an inherent viscosity of 0.52 dl/gm), 4.95% $CaBr_2$, and 1.65% acetic anhydride in N-methyl 2 pyrolidone (NMP) was prepared.

The concentrated solution was extruded at a rate of 180 $cm^3$/hr through a spinneret with fiber channel dimensions of outer diameter 559 microns and inner diameter equal to 254 microns at 90° C. A solution containing 87% weight NMP in water was injected to the bore of the fiber at a rate of 33 $cm^3$/hr. The nascent fiber traveled through an air gap length of 1 cm at room temperature into a water coagulant bath at 5° C. and wound up at a rate of 55 meters/min. The water-wet fiber was rinsed with running water at 50° C. for about 12 hours and then sequentially exchanged with methanol and hexane as taught in U.S. Pat. Nos. 4,080,744 and 4,120,098, followed by drying at 100° C. in a vacuum oven for one hour.

Fibers of the Comparative example were tested for $He/N_2$ separation while applying 69 MPa (100 psi) pressure in the shell side of the fibers at 23° C. The results are reported in Table 4.

The Comparative example fibers were treated to seal defects in the dense separating layer by contacting the outer surfaces of the fibers with a 2% weight solution of Sylgard 184 (Dow Corning Corp) in iso-octane. The exposure time of the fibers to the post-treatment was 30 minutes. The fibers were dried in a vacuum oven at 100° C. The treated fibers were tested as above and the results are reported in Table 4.

The Comparative example fibers produced from the virgin polyimide polymer were brittle during handling and exhibited filament-to-filament variability in elongation at break. Several fibers fell apart during handling, which made module preparation process very difficult. The inherent viscosity of the polymer fibers was measured and found to be about 0.34 dl/gm, which indicated a significant reduction in polymer molecular weight. This reduction in molecular weight, as discussed above is due to hydrolysis of imide (or residual amide) linkages of the polymer during spin dope preparation and storage and spinning steps at elevated temperatures and during subsequent fiber washing and solvent exchange/drying steps. The mechanical properties of the fibers were measured in extension and the results are reported in Table 4. The low and variable maximum strain is consistent with the observation that the fibers were brittle, presumably as a result of polymer molecular weight degradation.

Examples of the annealed polyimide polymer membrane and membranes of a blend of the annealed polyimide and additional polymer were also produced.

Example 1

A sample of polyimide polymer sold under the tradename P84 (lot 811, which is the same lot as the Comparative example above), was annealed in a convection oven at 175° C. for 20 hours while being exposed to a vacuum level of about 20 inches of $H_g$ with a $N_2$ sweep. The inherent viscosity of the annealed polymer sample was measured to be 0.6 dl/gm, which indicates a significant increase in polymer molecular weight over the non-annealed sample. The annealed polymer was utilized to prepare a concentrated solution (spin dope) containing 32% by weight annealed polyimide polymer, 1.6% $CaBr_2$, 1.6% acetic anhydride, 0.32% acetic acid, and 6.4% tetramethylenesulfone in NMP. The concentrated solution was extruded at a rate of 180 $cm^3$/hr through a spinneret with fiber channel dimensions of outer diameter 559 microns and inner diameter equal to 254 microns at 80° C. A solution containing 85% weight NMP in water was injected to the bore of the fiber at a rate of 33 $cm^3$/hr. The nascent fiber traveled through an air gap length of 2.5 cm at room temperature into a water coagulant bath at 25° C. and wound up at a rate of 55 meters/min. The water-wet fiber was washed and solvent exchanged as discussed in the Comparative example above.

The example fibers were tested for $He/N_2$ separation while applying 0.69 MPa (100 psi) pressure in the shell side of the fibers at 23° C. The results are reported in Table 4.

The example fibers were treated as described for the Comparative example above and tested to obtain the results reported in Table 4.

The inherent viscosity of the example fibers was measured and found to be about 0.6 dl/gm indicating essentially no polymer molecular weight degradation for the annealed polymer. The mechanical properties of the fibers were also measured to obtain the results reported in Table 4. The maximum strain surprisingly exhibited essentially no filament-to-filament variability. The fibers spun from the annealed polyimide polymer could be readily subjected to downstream processing operations without breaking because of increased elasticity.

TABLE 4

| | Comparative Example (Non-Annealed) | Example 1 (Annealed Polyimide) |
|---|---|---|
| He Permeance (untreated) | 200 | 280 |
| $He/N_2$ Selectivity (untreated) | 25 | 62 |
| He Permeance (treated)* | 119 | 213 |
| $He/N_2$ Selectivity (treated)* | 167 | 200 |
| Elastic Modulus (MPa) | 896 | 703 |

TABLE 4-continued

| | Comparative Example (Non-Annealed) | Example 1 (Annealed Polyimide) |
|---|---|---|
| Yield Stress (MPa) | 30 | 29 |
| Maximum Strain (%) | 5-15 | 119 |

Permeance is reported in GPU (Gas Permeation Unit)
1 GPU = 1 × 10$^{-6}$ cm$^3$ (STP)/(cm$^2$ s cmHg)
MPa = MegaPascals
*Membrane was post-treated with 2% Sylgard 184 solution in iso-octane and dried

Example 2

A sample of polyimide polymer sold under the tradename P84 (lot 8015A) was annealed in a convection oven at 160° C. for 12 hours while being exposed to a vacuum level of about 20 inches of H$_g$ with a N$_2$ sweep. A concentrated solution (spin dope) was prepared containing 32% by weight of a 1:1 mixture in NMP of the annealed polyimide polymer and the polyamide-imide sold under the tradename Torlon®. The solution also included, by wt., 5% CaBr$_2$, 2% acetic anhydride, and 20% tetramethylenesulfone. The concentrated solution was extruded through a spinneret as a monolithic fiber at a rate of 180 cm$^3$/hr. Three spins each were performed at spinnerette temperatures of 75° C., 80° C., and 85° C. A solution containing 85% weight NMP in water was injected to the bore of the fiber at a rate of 33-38 cm$^3$/hr. For each spin in a set of three spins at a particular spinnerette temperature, the air gap (through which the nascent fiber traveled) was maintained at either 1.0 cm or 2.5 cm at room temperature into a water coagulant bath at 30° C. and wound up at a rate of 55 or 90 meters/min. The water-wet fiber was washed and solvent exchanged as discussed in the Comparative example above.

A hank of fibers was accumulated and placed in a permeator for testing their effectiveness for He/N$_2$ separation. The feed pressure was maintained at 0.69 MPa (100 psi) and the temperature of the permeator was maintained at 24.9° C. The results are reported in Table 5.

The example fibers were treated as described for the Comparative example above and tested to obtain the results reported in Table 5.

Example 3

One sample of polyimide polymer sold under the tradename P84 (lot 6501) was annealed in a convection oven at 160° C. for 12 hours while being exposed to a vacuum level of about 20 inches of H$_g$ with a N$_2$ sweep. A concentrated sheath solution (spin dope) was prepared containing 33% by weight of a 1:1 mixture in NMP of the annealed polyimide polymer and polyethersulfone. The sheath solution also included, by wt., 5% CaBr$_2$, 2% acetic anhydride, and 20% tetramethylenesulfone. A concentrated core solution (spin dope) was prepared containing 33% by wt. of the annealed polyimide polymer, 5% CaBr$_2$, 2% acetic anhydride, 1% acetic acid, and 20% tetramethylenesulfone in NMP. The sheath and core solution were extruded at a rate of 18 and 180 cm$^3$/hr, respectively through a composite fiber spinneret. Four spins each were performed at spinnerette temperatures of 77° C., 77° C., 86° C., and 88° C. A solution containing 82.5% weight NMP in water was injected to the bore of the fiber at a rate of 38 cm$^3$/hr. The air gap (through which the nascent fiber traveled) was maintained at either 2.5 cm or 5.0 cm at room temperature into a water coagulant bath at 40° C. and wound up at a rate of 90 meters/min. The water-wet fiber was post-treated.

A hank of fibers was accumulated and placed in a permeator for testing their effectiveness for He/N$_2$ separation. The feed pressure was maintained at 0.69 MPa (100 psi) and the temperature of the permeator was maintained at 24.9° C. The results are reported in Table 5.

The example fibers were treated as described for the Comparative example above and tested to obtain the results reported in Table 5.

TABLE 5

| Example | He Permeance | He/N$_2$ Selectivity |
|---|---|---|
| Example 2 | 103 | 235 |
| Example 3 | 278 | 61.23 |

Permeance is reported in GPU (Gas Permeation Unit)
1 GPU = 1 × 10$^{-6}$ cm$^3$ (STP)/(cm$^2$ s cmHg)
MPa = MegaPascals
*Membrane was treated with 2% Sylgard 184 solution in iso-octane and dried Although the present invention has been described in considerable detail with reference to certain preferred versions and examples thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A membrane for fluid separation formed from a polymeric composition comprising an annealed polyimide which is the annealing product of a virgin polymer comprising a plurality of first repeating units of a formula (I) and a plurality of second repeating units, wherein:
said formula (I) is:

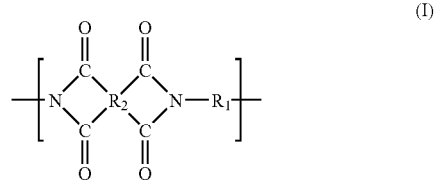

(I)

in which R$_1$ of said formula (I) is a moiety having a composition selected from the group consisting of a formula (A), a formula (B), a formula (C), and mixtures thereof; said formula (A), said formula (B), and said formula (C) are:

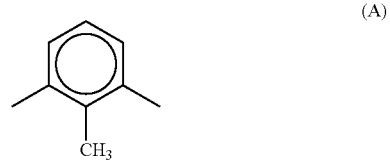

(A)

-continued

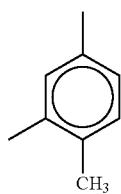
(B)

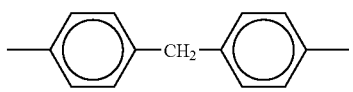
(C)

$R_2$ of said formula (I) is a moiety having a composition selected from the group consisting of a formula (Q), a formula (S), a formula (T), and mixtures thereof, wherein said formula (Q), said formula (S), and said formula (T) are:

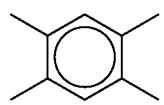
(Q)

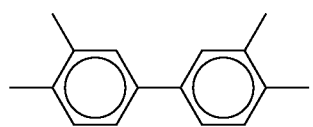
(S)

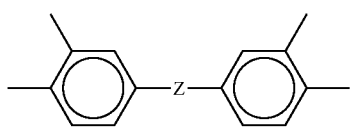
(T)

in which Z of said formula (T) is a moiety having a composition selected from the group consisting of a formula (L), a formula (M), a formula (N), and mixtures thereof; said formula (L), said formula (M), and said formula (N) are:

(L)

(M)

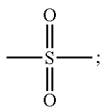
(N)

and said second repeating units are represented by formula (II):

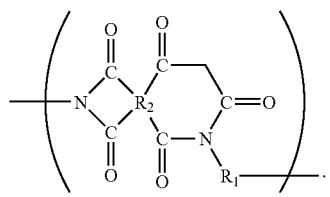
(II)

2. The membrane of claim 1, wherein a membrane of said annealed polyimide polymer has a maximum strain of greater than about 50%.

3. The membrane of claim 1, wherein said maximum strain is greater than about 100%.

4. The membrane of claim 2, wherein said membrane is a hollow fiber.

5. The membrane of claim 1, wherein an inherent viscosity of said annealed polyimide polymer is greater than about 0.58 dl/gm.

6. The membrane of claim 1, wherein said first repeating units comprise moieties of a formula (Ia), wherein said formula (Ia) is:

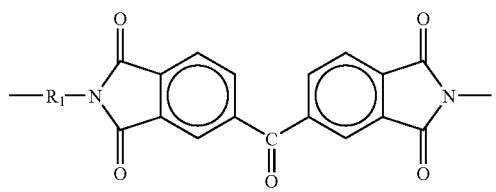
(Ia)

wherein $R_1$ of formula (Ia) is a moiety selected from the group consisting of said formula (A), said formula (B), said formula (C), and mixtures thereof.

7. The membrane of claim 6, wherein said moiety $R_1$ has a composition of:

a) said formula (A) in about 10-25% of said first repeating units;

b) said formula (B) in about 55-75% of said first repeating units; and c) said formula (C) in about 20-40% of said first repeating units.

8. The membrane of claim 7, wherein said moiety $R_1$ has a composition of:

a) said formula (A) in about 16% of said first repeating units;

b) said formula (B) in about 64% of said first repeating units; and c) said formula (C) in about 20% of said first repeating units.

9. The membrane of claim 1, wherein said first repeating units comprise moieties of a formula (Ib), wherein formula (Ib) is:

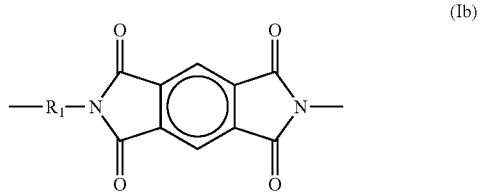

wherein said R₁ of formula (Ib) is a moiety wherein said R₁ of formula (Ib) is a moiety selected from the group consisting of said formula (A) and said formula (B), and mixtures thereof.

10. The membrane of claim 1, wherein said first repeating units comprise moieties of:
    a) a formula (Ia); and
    b) a formula (Ib),
wherein said formula (Ia) and said formula (Ib) are:

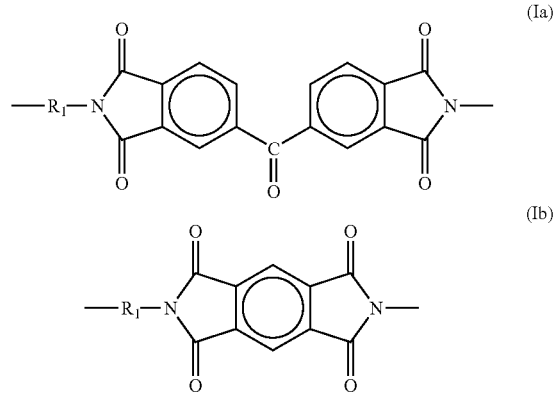

and wherein R₁ is a moiety selected from the group consisting of said formula (Q) and said formula (S), and mixtures thereof.

11. The membrane of claim 1, wherein R₁ is a moiety having a composition of:
    a) said formula (A) in about 10-30% of said first repeating units; and
    b) said formula (B) in about 70-90% of said first repeating units, wherein said first repeating units of said formula (Ib) are about 30-50% of the total of said first repeating units.

12. The membrane of claim 11, wherein R₁ is a moiety having a composition of:
    a) said formula (A) in about 20% of said first repeating units; and
    b) said formula (B) in about 80% of said first repeating units; and
    c) wherein said first repeating units of said formula (Ib) are about 40% of the total of said first repeating units.

13. The membrane of claim 1, wherein said second repeating units comprises less than about 3 mole % of a total of said first and second repeating units.

14. The membrane of claim 13, wherein said second repeating units comprises less than about 1 mole % of a total of said first and second repeating units.

15. The membrane of claim 13, wherein said membrane is a hollow fiber.

16. The membrane of claim 1, wherein said annealed polyimide polymer has been annealed by a process selected from the group consisting of mechanical annealing, thermal annealing, or combinations thereof.

17. The membrane of claim 1, wherein the polymeric composition further comprises an additional polymer blended with a polyethersulfone before membrane formation, the polyethersulfone having repeating units represented by formula III:

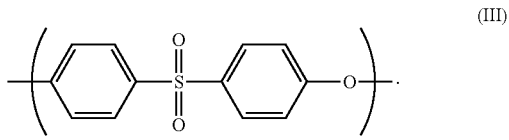

18. The membrane of claim 1, wherein the polymeric composition further comprises an additional polymer blended with the annealed polyimide polymer before membrane formation, the additional polymer comprising repeating units represented by formula (IV) and repeating units represented by formula (V):

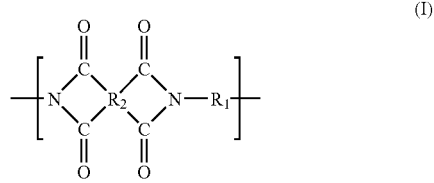

19. A method of producing a fluid separation membrane, said method comprising the steps of:
    providing a virgin polymer comprising a plurality of first repeating units of a formula (I) and a plurality of second repeating units of a formula (II);
    annealing said virgin polymer to form an annealed polymer;
    preparing a concentrated solution of said annealed polyimide polymer in a solvent; and
    forming a membrane from said concentrated solution,
    wherein:
    a) said formula (I) is:

$$\left[ \begin{matrix} O & O \\ \| & \| \\ C & C \\ N & R_2 & N-R_1 \\ C & C \\ \| & \| \\ O & O \end{matrix} \right]$$ (I)

in which R₁ of said formula (I) is a moiety having a composition selected from the group consisting of a formula (A), a formula (B), a formula (C), and mixtures thereof;

b) formula (A), said formula (B), and said formula (C) are:

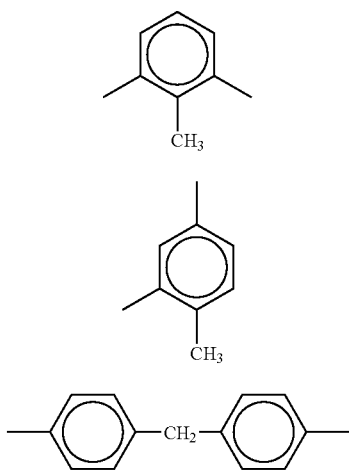

(A)

(B)

(C)

and in which $R_2$ of said formula (I) is a moiety having a composition selected from the group consisting of a formula (Q), a formula (S), a formula (T), and mixtures thereof;

c) said formula (Q), said formula (S), and said formula (T) are:

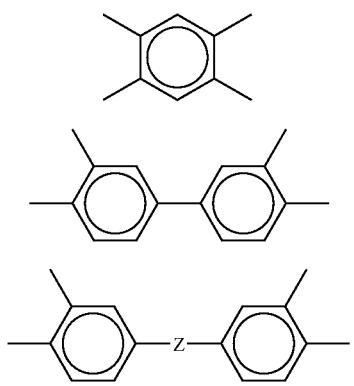

(Q)

(S)

(T)

in which Z of said formula (T) is a moiety having a composition selected from the group consisting of a formula (L), a formula (M), a formula (N), and mixtures thereof;

d) said formula (L), said formula (M), and said formula (N) are:

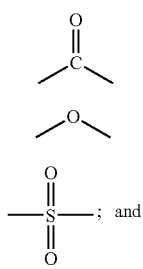

(L)

(M)

(N); and e) said formula (II) is:

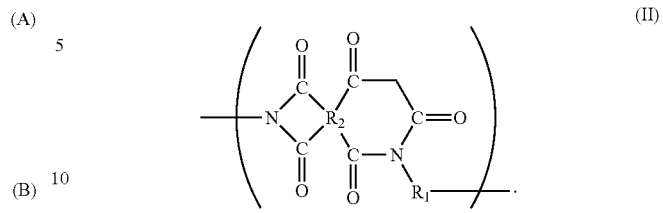

(II)

20. The method of claim 19, wherein said annealed polyimide polymer comprises less than about 3 mole % said second repeating units.

21. The method of claim 20, wherein said annealed polyimide polymer comprises less than about 1 mole % said second repeating units after said annealing step.

22. The membrane of claim 19, wherein said first repeating units comprise moieties selected from the group consisting of a formula (Ia), a formula (Ib), and mixtures thereof, wherein said formula (Ia) and said formula (Ib) are:

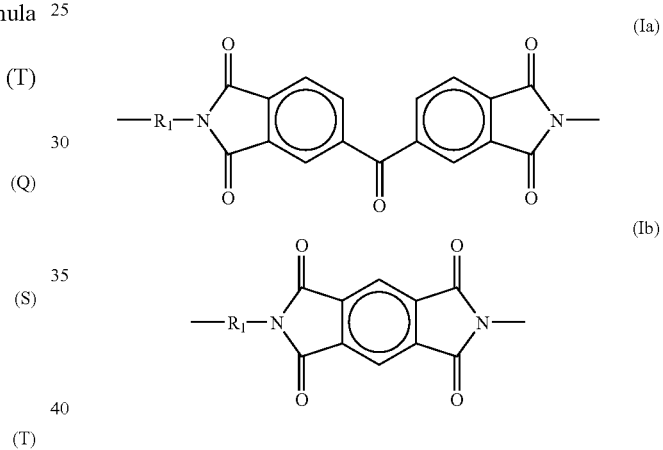

(Ia)

(Ib)

and wherein $R_1$ is a moiety selected from the group consisting of said formula (Q) and said formula (S), and mixtures thereof.

23. The membrane of claim 19, wherein:
$R_1$ is a moiety having a composition of said formula (A) in about 10-30% of said first repeating units and said formula (B) in about 70-90% of said first repeating units; and
said first repeating units of said formula (Ib) are about 30-50% of the total of said first repeating units.

24. The method of claim 19, wherein said annealing step is conducted by a process selected from the group consisting of mechanical annealing, thermal annealing, or combinations thereof.

25. The method of claim 24, wherein said annealing step is conducted for a period of time of about 6-30 hours at a temperature of about 100-250° C.

26. The method of claim 25, wherein said period of time is about 10-16 hours and said temperature is about 140-180° C.

27. The method of claim 24, wherein said annealing step is conducted under a vacuum of greater than about 15 inches of mercury.

28. The method of claim 19, wherein said concentrated solution comprises about 30 weight % said annealed polyimide polymer, wherein said solvent is NMP, and wherein said concentrated solution has a zero-shear complex viscosity of greater than about 90 Pa·s at 40° C.

29. The method of claim 28, wherein said concentrated solution has a zero-shear complex viscosity of greater than about 150 Pa·s at 40° C.

30. The method of claim 28, wherein said concentrated solution has a zero-shear complex viscosity in a range of about 150 Pa·s to about 500 Pa·s at 40° C.

31. The method of claim 19, wherein said membrane is a hollow fiber membrane.

32. The method of claim 19, wherein the inherent viscosity of said annealed polyimide polymer is at least about 5% greater than the inherent viscosity of said polyimide polymer.

33. The method of claim 19, wherein the concentrated solution further includes a polyethersulfone having repeating units represented by formula (III):

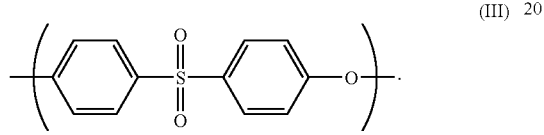
(III)

34. The method of claim 19, wherein the concentrated solution further includes an additional polymer comprising repeating units represented by formula (IV) and repeating units represented by formula (V):

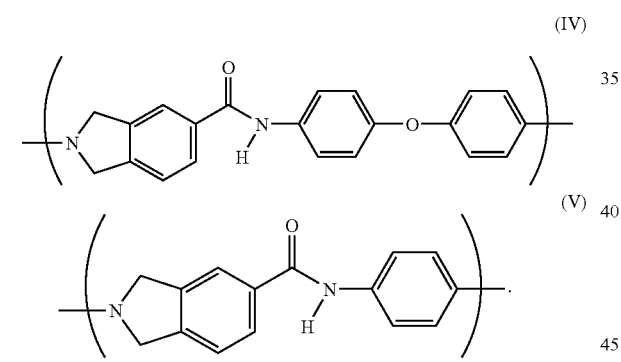
(IV)

(V)

35. A membrane for fluid separation formed from a polymeric composition comprising a polyimide and a polyethersulfone, the polymide comprising a plurality of first repeating units of a formula (I) and a plurality of second repeating units, wherein:

said formula (I) is:

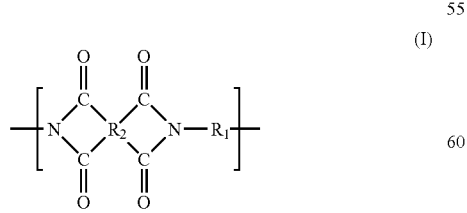
(I)

in which $R_1$ of said formula (I) is a moiety having a composition selected from the group consisting of a formula (A), a formula (B), a formula (C), and mixtures thereof;

said formula (A), said formula (B), and said formula (C) are:

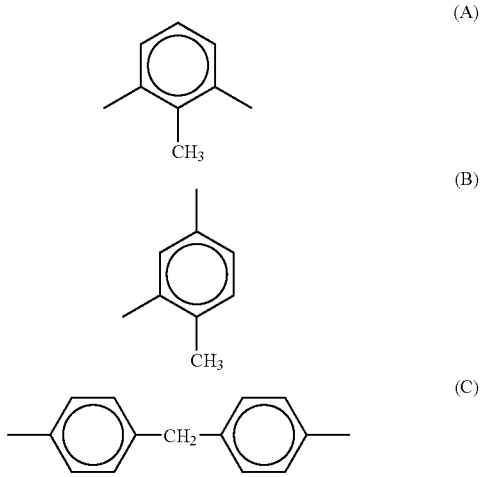
(A)

(B)

(C)

$R_2$ of said formula (I) is a moiety having a composition selected from the group consisting of a formula (Q), a formula (S), a formula (T), and mixtures thereof, wherein said formula (Q), said formula (S), and said formula (T) are:

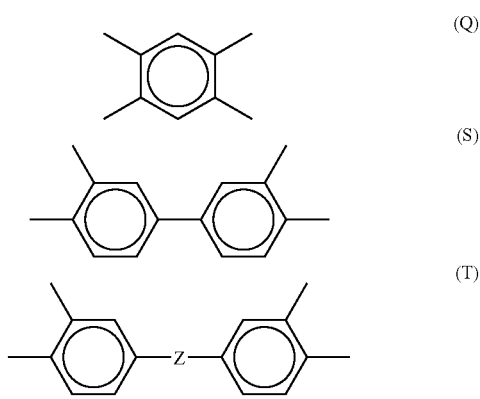
(Q)

(S)

(T)

in which Z of said formula (T) is a moiety having a composition selected from the group consisting of a formula (L), a formula (M), a formula (N), and mixtures thereof;

said formula (L), said formula (M), and said formula (N) are:

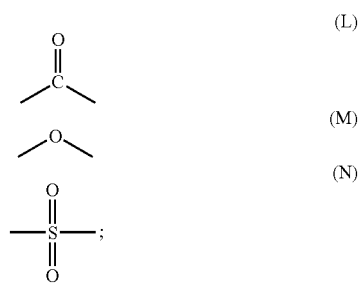
(L)

(M)

(N)

said second repeating units are represented by formula (II):

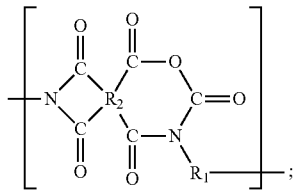
(II)

and said polyethersulfone comprises repeating units represented by formula (III):

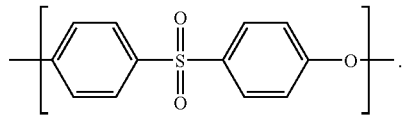
(III)

36. A membrane for fluid separation formed from a polymeric composition comprising a polyimide and a polyamide-imide, the polyimide comprising a plurality of first repeating units of a formula (I) and a plurality of second repeating units, wherein:

said formula (I) is:

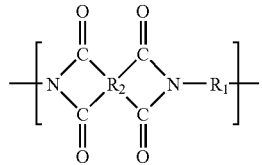
(I)

in which $R_1$ of said formula (I) is a moiety having a composition selected from the group consisting of a formula (A), a formula (B), a formula (C), and mixtures thereof; said formula (A), said formula (B), and said formula (C) are:

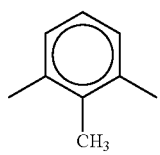
(A)

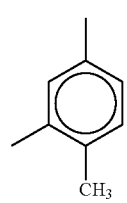
(B)

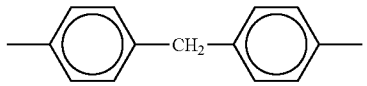
(C)

$R_2$ of said formula (I) is a moiety having a composition selected from the group consisting of a formula (Q), a formula (S), a formula (T), and mixtures thereof, wherein said formula (Q), said formula (S), and said formula (T) are:

(Q)

(S)

(T)

in which Z of said formula (T) is a moiety having a composition selected from the group consisting of a formula (L), a formula (M), a formula (N), and mixtures thereof; said formula (L), said formula (M), and said formula (N) are:

(L)

(M)

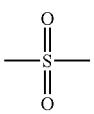
(N)

said second repeating units are represented by formula (II):

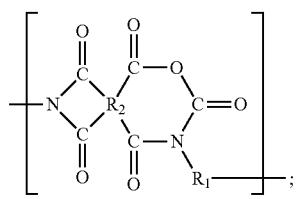
(II)

and
said polyamide-imide comprises repeating units represented by formula (IV) and repeating units represented by formula (V):
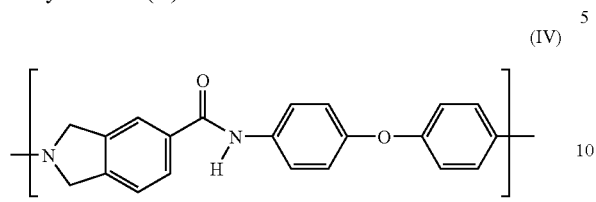
(IV)
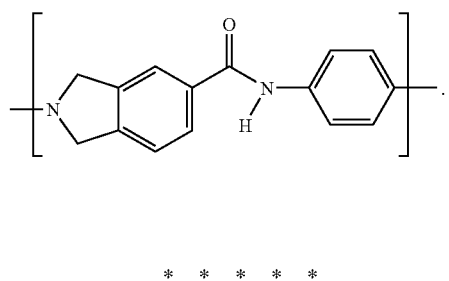
(V)
\* \* \* \* \*

UNITED STATES PATENT AND TRADEMARK OFFICE
CERTIFICATE OF CORRECTION

PATENT NO. : 8,101,009 B2
APPLICATION NO. : 12/206449
DATED : January 24, 2012
INVENTOR(S) : O. Ekiner et al.

It is certified that error appears in the above-identified patent and that said Letters Patent is hereby corrected as shown below:

In Column 22, formula (II), replace " 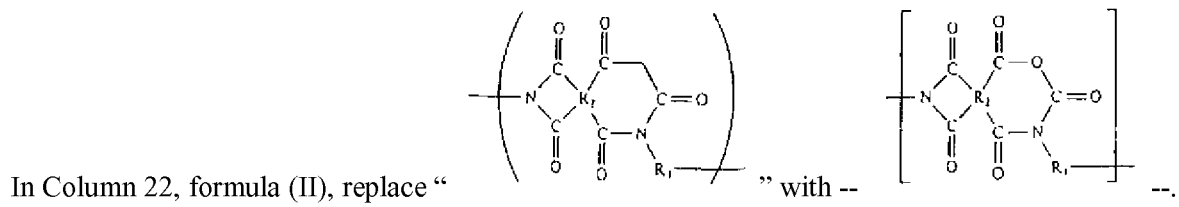 " with -- --.

In Column 26, formula (II), replace " 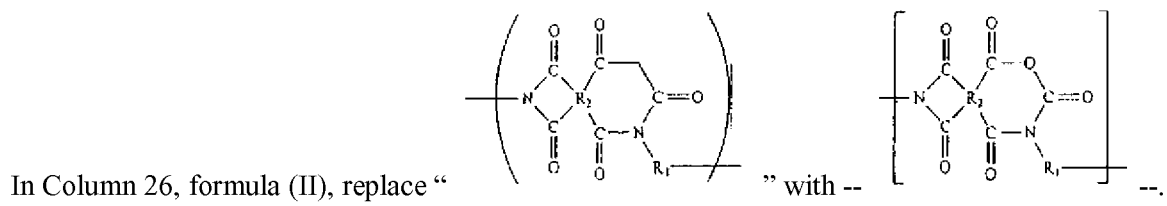 " with -- --.

Signed and Sealed this
Third Day of April, 2012

David J. Kappos
*Director of the United States Patent and Trademark Office*